United States Patent
Hudson et al.

(10) Patent No.: US 6,256,723 B1
(45) Date of Patent: Jul. 3, 2001

(54) SIGNAL PROCESSING SYSTEM WITH DISTRIBUTED UNIFORM MEMORY

(75) Inventors: Michael Hudson, Portland, OR (US); Daniel L. Moore, Vancouver, WA (US)

(73) Assignee: Diamond Multimedia Systems, Inc., San Jose, CA (US)

( * ) Notice: Subject to any disclaimer, the term of this patent is extended or adjusted under 35 U.S.C. 154(b) by 0 days.

(21) Appl. No.: 09/060,746

(22) Filed: Apr. 15, 1998

(51) Int. Cl.[7] .............................. G06F 12/06; G06F 13/40
(52) U.S. Cl. ........................ 712/35; 712/36; 711/148; 711/129
(58) Field of Search ........................... 711/149, 147, 711/114, 129, 131, 148, 130; 710/16; 707/205; 712/35, 36; 704/200, 269; 703/25

(56) References Cited

U.S. PATENT DOCUMENTS

| | | | |
|---|---|---|---|
| 4,718,080 | 1/1988 | Serrano et al. | 379/59 |
| 4,775,931 | 10/1988 | Dickie et al. | 364/200 |
| 4,991,085 | 2/1991 | Pleva et al. | 364/200 |
| 5,127,041 | 6/1992 | O'Sullivan | 379/59 |
| 5,134,648 | 7/1992 | Hochfield et al. | 379/98 |
| 5,167,021 | 11/1992 | Needham | 395/275 |
| 5,181,858 | 1/1993 | Matz et al. | 439/188 |
| 5,249,218 | 9/1993 | Sainton | 379/59 |
| 5,302,947 | 4/1994 | Fuller et al. | 340/825.34 |
| 5,333,177 | 7/1994 | Braitberg et al. | 379/59 |
| 5,357,625 | 10/1994 | Arends | 395/500 |
| 5,384,890 | * 1/1995 | Anderson et al. | 704/200 |
| 5,410,667 | * 4/1995 | Belsan et al. | 711/114 |
| 5,428,671 | 6/1995 | Dykes et al. | 379/93 |
| 5,430,793 | 7/1995 | Ueltzen et al. | 379/98 |
| 5,649,001 | 7/1997 | Thomas et al. | 379/93.07 |

OTHER PUBLICATIONS

Competitive Analysis: Analog Devices, Inc.; *ADSP–2104 vs. Texas Instruments* TMS320C203 [ADSP–2104]; 1996 Analog Devices, Inc.

* cited by examiner

*Primary Examiner*—Daniel H. Pan
(74) *Attorney, Agent, or Firm*—Gerald B. Rosenberg; NewTechLaw

(57) ABSTRACT

A system is disclosed that includes a plurality of processors, which in some embodiments include DSPs and other microprocessors, and a distributed uniform memory. The distributed uniform memory is subdivided into a plurality of addressable memory spaces each of which are respectively primarily associated with one of the processors in the plurality of processors. At least an addressably contiguous portion of the addressable memory space primarily associated with one processor is mapped into the addressable memory space primarily associated with another processor. Thus, a processor will have access to the addressable memory space primarily associated with another processor, but will have such access independent of the load and timing requirements of the other processors.

21 Claims, 15 Drawing Sheets

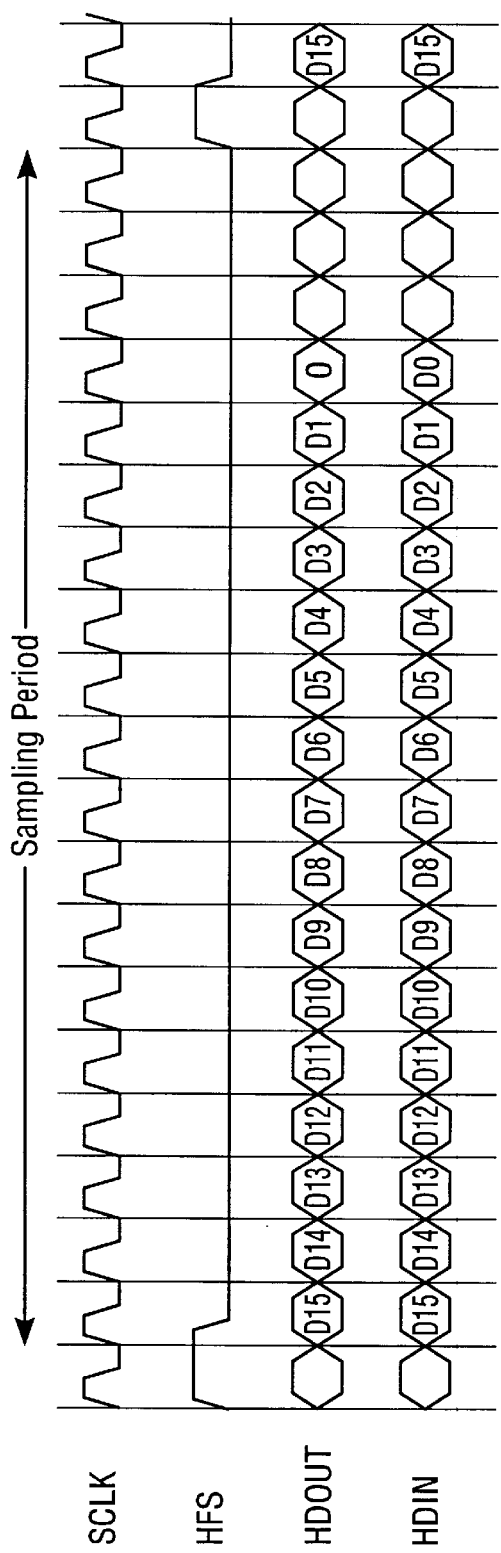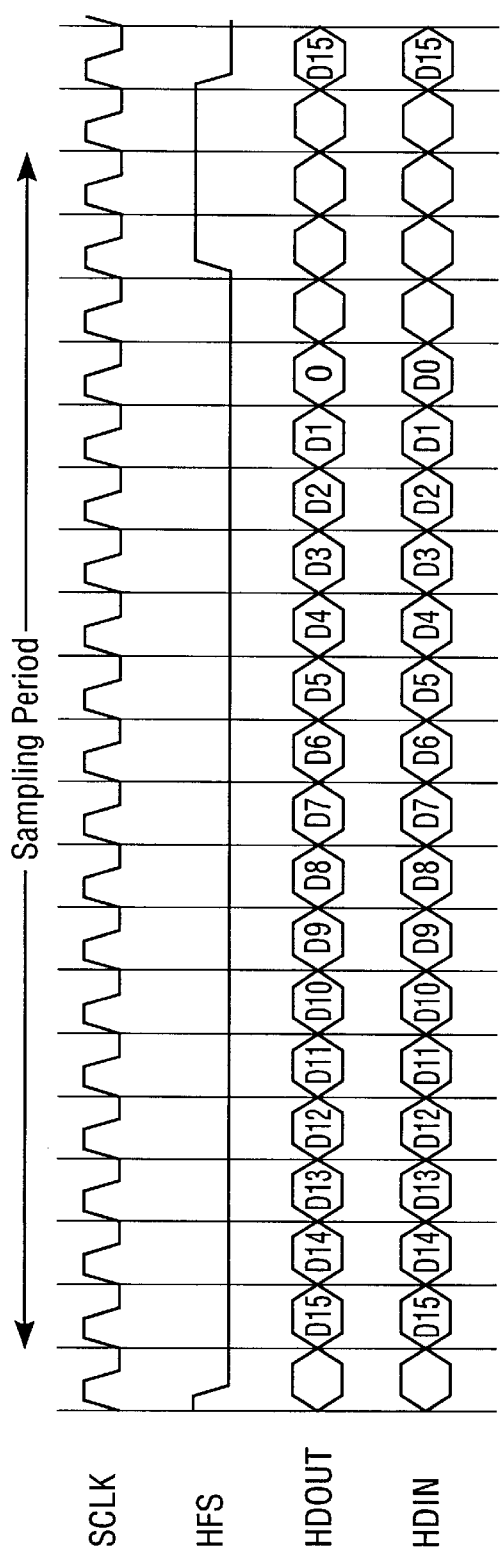

SIGNAL PROCESSING SYSTEM WITH DISTRIBUTED UNIFORM MEMORY

FIELD OF INVENTION

The invention relates to signal processing systems, and in particular, the invention relates to a signal processing system adaptable to perform a variety of signal processing functions, including communication, audio, and multimedia.

BACKGROUND

Signal processing systems have become widespread and include communication systems (such as modems, facsimile, answering machines, and speaker phones), audio systems, and multimedia systems (such as digital video disk, or "DVD"). Signal processing devices can be either internal or external to a host computer, such as a "PC," and typically interface with the host computer as well as with the external world, e.g., via a telephone network, audio speakers, or a video screen.

Most signal processing systems are function-specific and include software and hardware dedicated to that particular function. For instance, in a signal processing system that performs a modem function, the system will include specific hardware for interfacing to a telephone network, including analog front end (AFE) hardware and data access arrangement (DAA) hardware, as well as a considerable amount of program code stored in the system and specific for modem communications. Such program code is often stored in the system on a Read Only Memory (ROM), which can be written to only once and cannot be changed once written.

Still, despite their differences in functionality, many signal processing systems utilize similar hardware elements, particularly for digital signal processing, such as DSPs (digital signal processors) and microprocessors. Yet, because of analog hardware considerations, particularly to interface to the outside world, and because the software differs, each digital signal processing device must be purchased separately.

Moreover, even within a single type of signal processing system, standards are not constant either geographically or temporally. For instance, an international business traveler using a laptop computer cannot use in Europe the same modem he purchased in the United States. In fact, because even communication standards vary from country to country in Europe, the international traveler may need to carry several modems, each complying with a different country's communication standards, in order to communicate using a modem at each destination. Furthermore, each time a different modem is to be used, the host system will have to be notified and often will need to be reconfigured to utilize the modem.

In addition, signal processing technology is progressing at a rapid rate. Even making relatively simple updates to the protocols used by signal processing systems, e.g., modems, is difficult because program code is usually unchangeable as being encoded in ROM. Thus, for consumers to take advantage of the newest technology, they generally have to replace their old systems. While recently, some modems have been developed with a degree of upgradability, e.g., 36 Kbps modems to 56 Kbps, because of the fixed nature of their hardware and software, most modems will have to be completely replaced to allow use of the most recent technology. In fact, when new communication technologies are widely available to consumers, including ISDN modems, DSL modems, cable modems, and wireless modems, a consumer wishing to utilize one of these new technologies will need to purchase a new device. Some companies have recognized in the modem arena that, for instance, the processing of modem data in various countries is the same, and only the network interface differs. These companies have developed communication adapters (primarily line conditioning and media conversion circuitry, e.g., DAA circuitry) that can be selectively coupled with their modem and that supply the necessary hardware and software configuration information to the modem in order to allow the modem to engage in any necessary signal processing to comply with the standards of various countries. These adaptors themselves perform no signal processing functions and in fact, the core software on the base system remains the same. The signal processing system itself can be used to perform no other function than that of a modem.

Thus, despite many commonalities among systems, a consumer who wants to be able to perform two distinct signal processing functions, or even upgrade his present signal processing system, the consumer must generally purchase two complete signal processing systems. Each of these systems will be dedicated to a specific signal processing function and technology standard.

Therefore, a signal processing system that allowed easy adaptability to a variety of signal processing functions, that would reduce signal processing system costs overall to the consumer, and that would allow upgrades as well as functional changes, would represent an advancement in the art.

SUMMARY OF THE INVENTION

A system is disclosed that allows a signal processing system to be configured to perform almost any signal processing function. Such a system includes a plurality of processors, which in some embodiments include DSPs and other microprocessors, and a distributed uniform memory. The distributed uniform memory is subdivided into a plurality of addressable memory spaces each of which are respectively primarily associated with one of the processors in the plurality of processors. Nonetheless, each processor has access to the addressable memory space primarily associated with another processor, but has such access independent of the load and timing requirements of the other processors.

In such a system, each of said plurality of processors is primarily associated with a bus and with one of the addressable memory spaces. At least an addressably contiguous portion of the addressable memory space primarily associated with one processor is mapped into the addressable memory space primarily associated with another processor. In this manner, access can be had to the memory resources of another processor without having to wait for access to the bus primarily associated with the other processor. Thus, no analysis of processor, bus, and/or memory load and/or timing requirements need occur. Such a system of shared memory resources among the processors will enhance operating speeds in multi-processor systems.

Such a system further allows for the access by a processor of the bus of another, thereby allowing the processor to directly access the addressable memory space primarily associated with another processor. Such direct access allows messaging among the processors without having to send interrupts to the receiving processor every time a message need be sent. In one embodiment, circular buffers are allocated in the addressable memory space of one of the processors. The circular buffers are constructed in such a way that each processor has sole control over particular pointers, eliminating contention for access to the same resources.

BRIEF DESCRIPTION OF THE DRAWINGS

The present invention is described with respect to particular exemplary embodiments thereof and reference is accordingly made to the drawings, which are not necessarily drawn to scale, in which:

FIGS. 8–9 are timing diagrams showing the timing of signals for an HSS channel in one embodiment of an interface 118 in accordance with the invention;

DETAILED DESCRIPTION OF THE INVENTION

Overview

A large number of signal processing systems, including communication systems, audio systems, and multimedia systems, utilize similar circuitry, albeit to perform distinct functions. For instance, many signal processing systems include a digital signal processor (DSP) and a microprocessor, along with a memory unit and various interfaces. Yet most of these systems also include some distinct circuitry and a considerable amount of distinct software to perform a particular function. Nonetheless, to take advantage of the similarities in most signal processing systems, a system in accordance with the invention creates a generic signal processing subsystem, composed of elements common to most signal processing systems (e.g., digital signal processing circuitry), and function-specific modules, alternatively couplable to the generic subsystem. By interchanging modules and program code, a system in accordance with the invention allows inexpensive functionality upgrades as well as inexpensive functionality alteration to a signal processing system.

Figure 1:
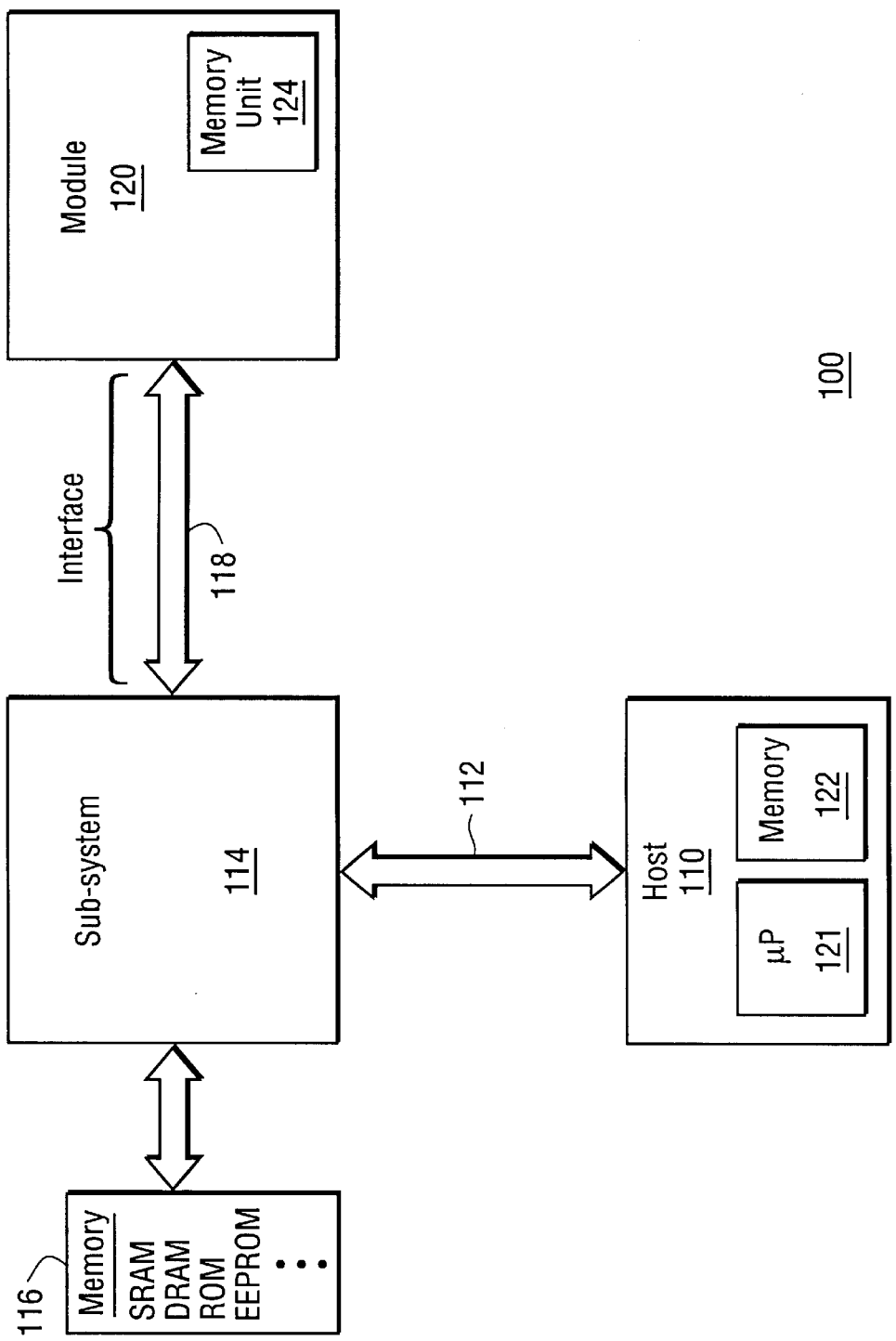
FIG. 1 is a generalized block diagram of a signal processing system in accordance with the invention.

A system in accordance with the invention is a functionally redefinable signal processing system as shown in one embodiment in FIG. 1. The system 100 of FIG. 1 includes a host 110 coupled via interface 112 to a functionally redefinable signal processing subsystem 114. Signal processing subsystem 114 utilizes memory pool 116, which in various embodiments of the invention may be SRAM, DRAM, ROM, EEPROM, and/or other memory devices. The signal processing subsystem 114 is further coupled via interface 118 to a function module 120.

In some embodiments, interfaces 112 and 118 can include physical connectors, allowing the respective elements to be releasably coupled to one another while in other embodiments the interfaces can simply be electrical conductors on an integrated circuit or a circuit board. Likewise, the elements shown in FIG. 1 can be packaged as individual devices, a single device (e.g., all included on a single circuit board and/or within a single computer system such as a PC), or a combination of both (e.g., subsystem 114 and memory pool 116 formed in a single package and couplable to a host system 110 and separately couplable to a separately packaged module 120). Moreover, in some embodiments of the invention, subsystem 114 is formed as a single piece of silicon, i.e., a single integrated circuit.

The host 110 in one embodiment of the invention is a personal computer ("PC"), commonly known in the art. Such a system will generally include a host processor 121 as well as host memory 122, which may include long term memory such as a hard drive and short term memory such as RAM, where memory 122 may be internal or external to the host system 110. The host 110 is connected to the subsystem 114 via interface 112. In various embodiments of the invention, interface 112 can be a serial interface (e.g., RS-232), an ISA interface, a USB interface, a PCI interface, a PCMCIA interface, an LPC interface, or any of a plurality other interfaces as are generally known in the art.

The functionally redefinable signal processing subsystem 114 can generally be thought of as the digital signal processing circuitry that would commonly be required to implement most signal processing systems, including communication systems (e.g., modems), audio systems, and/or multimedia systems (e.g., video, DVD). Such digital processing circuitry will generally include at least a digital signal processor (DSP), but in some embodiments of the invention, such digital signal processing circuitry will also include a microprocessor, such as a RISC processor, and/or additional DSPs. The subsystem 114 can be configured to perform most any signal processing function with software.

Thus, the subsystem 114 is a generic digital signal processing subsystem, containing little circuitry and/or program code to define a specific function it is to ultimately perform. Rather, the subsystem 114 is coupled with memory pool 116, which can be loaded and/or reloaded with program code specific to a given signal processing function to enable the subsystem to perform a specified function. To redefine the function of the subsystem 114, new code defining a new function is loaded into memory pool 116.

As used herein, the term "function" may designate a single capability or multiple capabilities to be performed by the subsystem 114 as a whole. For instance, a subsystem 114 may be configured to perform the function of analog modem (a single capability) or, alternatively, may be configured to perform the function of analog modem plus facsimile, or even analog modem plus facsimile plus speakerphone (multiple capabilities).

While subsystem 114 is generic, containing circuitry that can be used to support almost any signal processing function, the module 120 contains circuitry specific to a function to be performed. Module 120 can generally be thought of as interface circuitry to an external communication signal delivery media, which may include in various embodiments interface circuitry to a wide area network, (in the case of a modem), to speakers (in the case of an audio application), and/or to a display screen (in the case of some multimedia applications). Module 120 can, in some embodiments, be interchanged with another module 120 that contains circuitry to support a different function. In other words, each module 120 contains function-specific circuitry so that when coupled to the subsystem 114 via interface 118, a complete function-specific signal processing system can be implemented.

Figure 2:
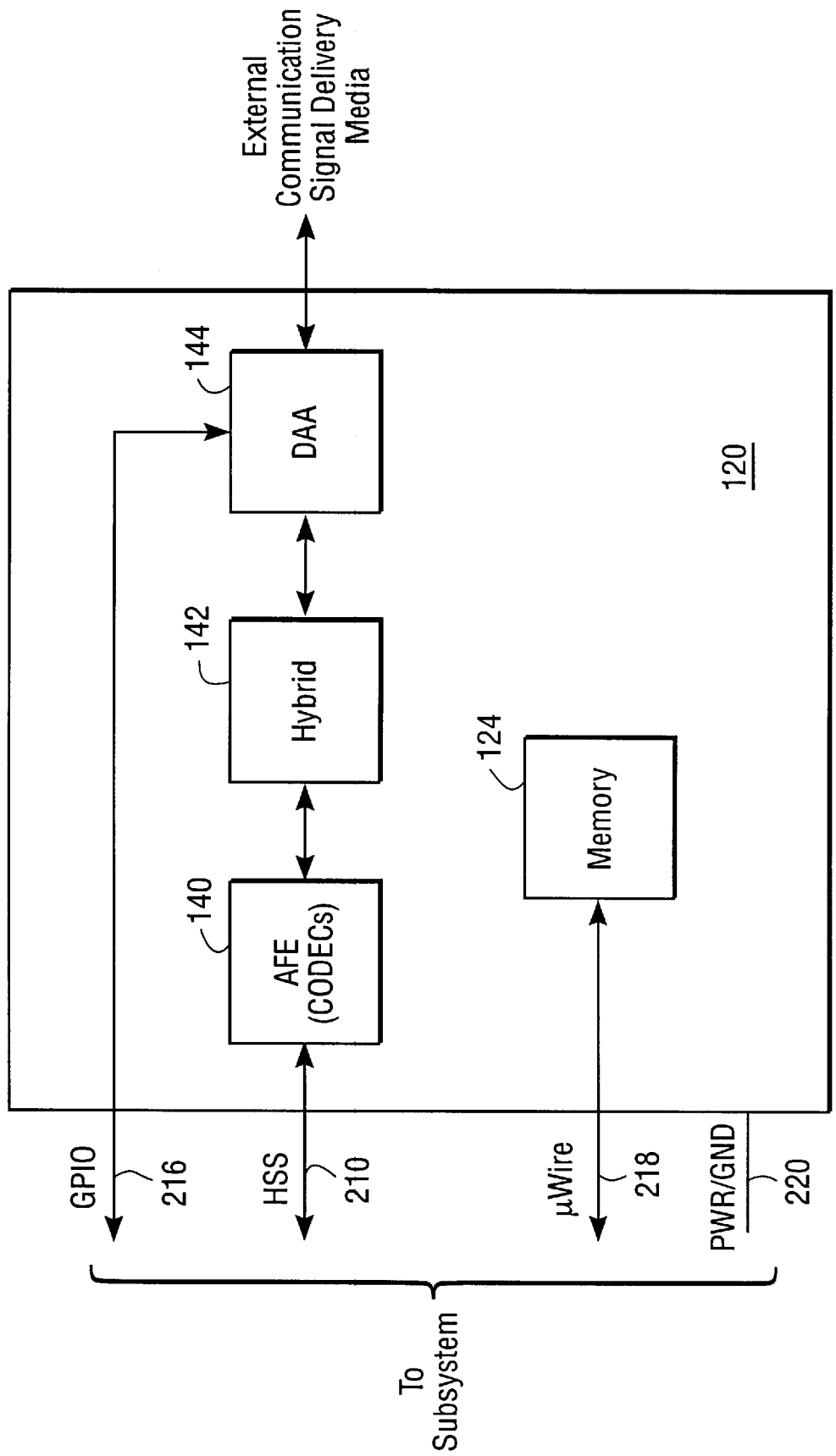
FIGS. 2–4 are generalized block diagrams of various embodiments of function-specific module 120.

For instance, referring to FIG. 2, when using subsystem 114 to form an analog modem, the module 120 attached to subsystem 114 via interface 118 will contain the necessary circuitry to perform an analog modem function such as analog front end (AFE) circuitry 140, hybrid circuitry 142, and data access arrangement (DAA) circuitry 144. AFE circuitry 140 includes standard modem serial codecs, such as SGS Thomson's ST7546 or Texas Instrument's TLC320AD56. DAA circuitry 144 is primarily involved in line conditioning, i.e., ensuring the outgoing signal is at appropriate voltage/current levels for the external communication signal delivery media. Hybrid circuitry 142 is involved in translating the signal to/from the AFE, which has separate receive and transmit lines, from/to the DAA which receives and transmits on one communication line. One or more General Purpose I/O lines may be coupled to DAA 144 for functional control of relays in some embodiments. Nonetheless, if utilizing subsystem 114 to perform a different function, e.g., a DSL modem instead of an analog modem, a function-specific DSL module would utilize different interface circuitry than an analog modem module, but will still use much of the same digital signal processing hardware of subsystem 114.

Figure 3:
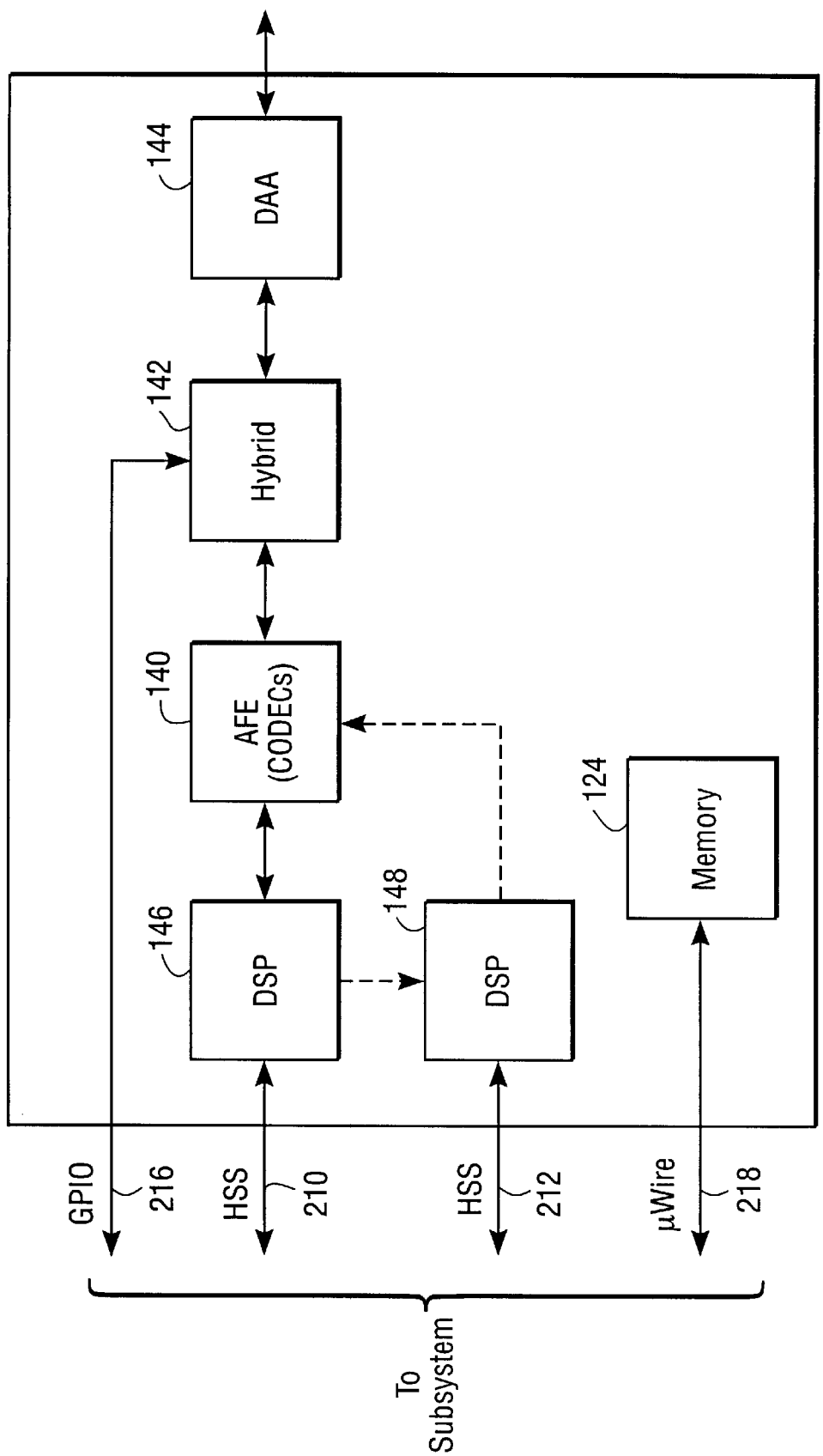

Thus, FIG. 3 shows another embodiment of a function-specific module 120 that contains additional DSPs 146, 148, that would, for instance, aid in performing digital signal processing. Such "helper DSPs" might not be necessary for a large number of functions that the subsystem is capable of performing in its generic state but may be desirable to increase system performance of more complex functions. While the "helper" DSPs shown in FIG. 3 each can communicate with the subsystem 114 via high speed serial (HSS) lines, alternatively the DSPs could be coupled in a serial manner as represented by the dashed lines in FIG. 3. Other numbers and configurations of "helper DSPs" are also possible in other embodiments. Thus, processing power can be varied for each function by varying either the number or arrangement of DSPs in each module 120.

Figure 4:
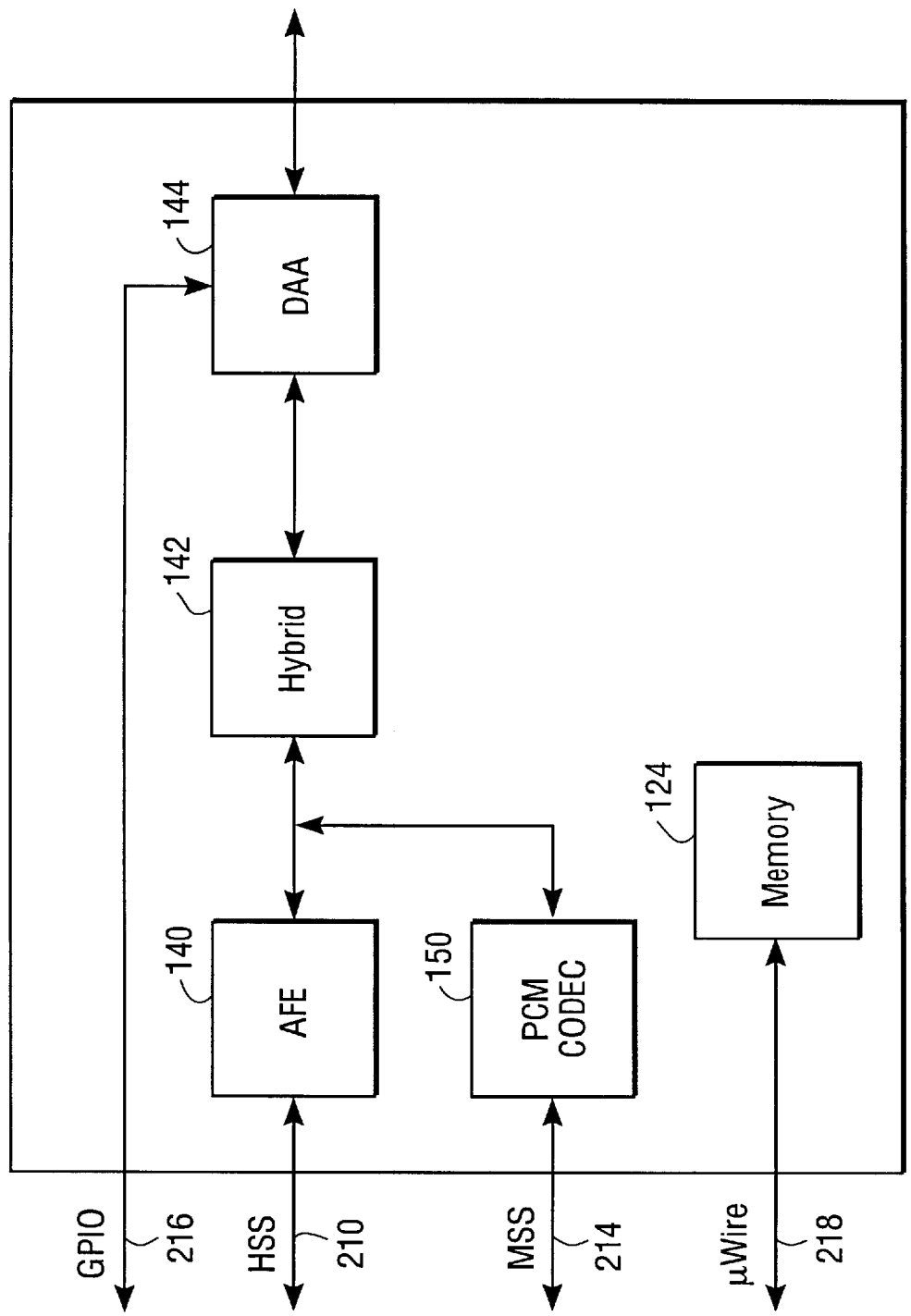

Another embodiment of a function-specific module 120 is shown in FIG. 4, where the module contains additional PCM codecs 150 useful for functions involving speakerphone, answering machine or other voice capabilities.

Thus, module 120 can be formed in a variety of arrangements and with varying degrees of processing power depending on the function to be implemented. Unlike the adapters of the prior art, however, function-specific modules 120 contain not only communication adapter circuitry (e.g., DAA), but also include a variable level of signal format conversion (e.g., codecs, DSPs). Considering the prior art, since the functionality of the prior art base systems never changes, i.e., they always remain modems, all signal format conversion circuitry would also not change and is therefore included in the base system. In contrast, in a system in accordance with the present invention, the functionality of the subsystem does change, including signal format conversion circuitry.

As used herein, "signal format conversion" is used to refer to a change in logical signal presentation, including digital-to-analog conversions and more traditional DSP processes such as communication protocol formatting. For instance, if a series of bits (e.g., 11001) is input into signal format conversion circuitry, the same series of bits will unlikely be output, although the information being transmitted may remain the same, such as when the data placed in a V.42 frame structure or otherwise encoded. In contrast, "communication adapter circuitry" is primarily involved in line conditioning and/or media conversion (e.g., signal translation frame cable-to-fiber, cable-to-cellular, etc.) and involves noise filtering, current limiting, and voltage adjustments, but does not generally involve a change in logical signal presentation. Thus, if a series of bits is input into communication adapter, the same series of bits will be output but the circuitry voltages, currents, media, etc. may have been changed or adjusted.

To identify the function that is to be performed by signal processing subsystem 114, each module 120 contains a non-volatile memory unit 124, such as a ROM or Flash memory, to store a function identifier. The function identifier may include, in some embodiments of the invention, a product identification code, a serial number, and/or other identifying information. The function identifier is read through the interface 118 by the subsystem 114 to determine the function the subsystem is to perform.

In general operation, when the subsystem 114 is powered up, the subsystem has enough instructions stored, for instance in a small on-board ROM, to read the function identifier from an attached module 120 through interface 118. Upon receiving the function identifier, the subsystem is then able to communicate with the host 110 to obtain program code, stored in memory 122, that characterizes the function of the subsystem 114 in accordance with the function identifier received from the module 120. Alternatively, function-defining code can be obtained from a remote server via, for example, an Internet connection. The code, or at least a portion thereof, is downloaded into the subsystem's memory pool 116, such as DRAM. Once code is loaded into the memory pool, then the subsystem 114, in combination with the module 120, can operate as a signal processing system to perform a specific function.

The function performed by the subsystem 114 can easily be changed, simply by coupling a new module 120 to the subsystem having a distinct function identifier. Once the new module is coupled to the subsystem 114, the new function identifier can be read, and new code downloaded into memory 116, allowing the subsystem to perform the new designated function.

Because a large portion of circuitry required by signal processing systems is the same, only a small amount of additional circuitry need be included in each function-specific module 120. Thus, when using a system in accordance with the invention, upgrades to functionality, as well as obtaining completely different signal processing functionality, will be inexpensive, merely requiring the switch of a module and new program code. Alternatively, code for a plurality of functions (accessible only with proper function identifiers) can be supplied to the consumer, so that when the consumer purchases a new module, the code is already present on the consumer's system. Conventionally, obtaining upgrades or new functionality has generally required the consumer to purchase an entirely new signal processing system.

While a general overview of a system in accordance with the invention has been given above, more specific details of various elements of such a system will be given in turn below.

Interface

Figure 5:
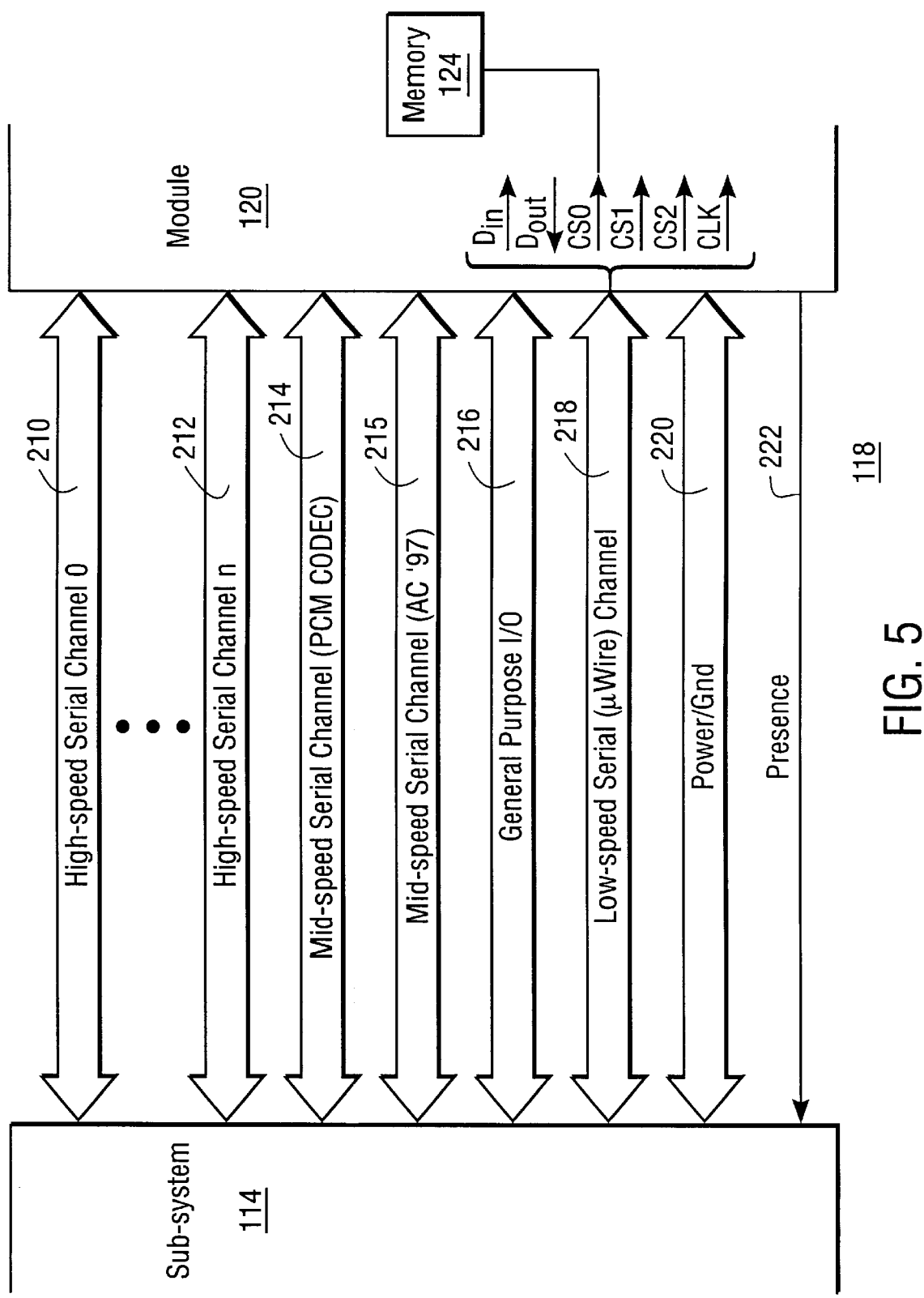
FIG. 5 is a generalized block diagram of an interface 118 in accordance with the invention.

The interface 118 between subsystem 114 and module 120 is generally a serial interface, having multiple serial channels. Referring to FIG. 5 such an interface generally includes two or more bi-directional high speed digital serial channels 210, 212, mid-speed serial channels 214, 215, general purpose I/O ports 216, a low-speed serial channel 218, power and ground signals 220, and a presence indicator 222. While all the lines for the interface shown in FIG. 5 are provided on one embodiment of the subsystem 114, not all the lines will be used by each particular module 120. For instance, referring to FIG. 2, if the module 120 is function-specific to an analog modem, where the module contains AFE and DAA circuitry, the lines on the interface that need to be used are a high-speed digital serial channel and the low speed serial interface 218 (as will be explained in more detail below, the low speed serial interface 218 is used to obtain the function identifier stored on module 120). FIG. 3 and 4 also show use of interface 118 with different modules 120. Thus, while various channels and signals are described below according to one embodiment of the invention, the interface 118 minimally requires only multiple high speed serial channels and a dedicated line for receiving the function identifier from the module 120 to be effective for use with the generic subsystem 114.

High-Speed Serial Channels 210, 212

Each high-speed serial channel 210, 212 includes signal lines which allow it to operate according to different protocols depending on the function implemented with the subsystem 114 and module 120. For instance, in an embodiment where the system is operating as an analog modem, the high speed serial interface will operate as an AFE interface. Still, the high speed serial channel can accommodate data transfer speeds for high speed functions such as cable modems and DSL modems. Such data transfer speeds will accommodate at least 1 Mbps, but will generally operate faster in most embodiments. The signal lines used for the high speed serial channel in one embodiment of the invention are as follows:

| Signal Name | Type | Description |
| --- | --- | --- |
| HD$_{in}$ | I | High Speed Serial Data in |
| HD$_{out}$ | O | High Speed Serial Data out |
| SCLK | I | Serial clock input |
| HFS | I | High Speed Frame sync |
| HSMP | O | High Speed Sample clock |

Figure 10:
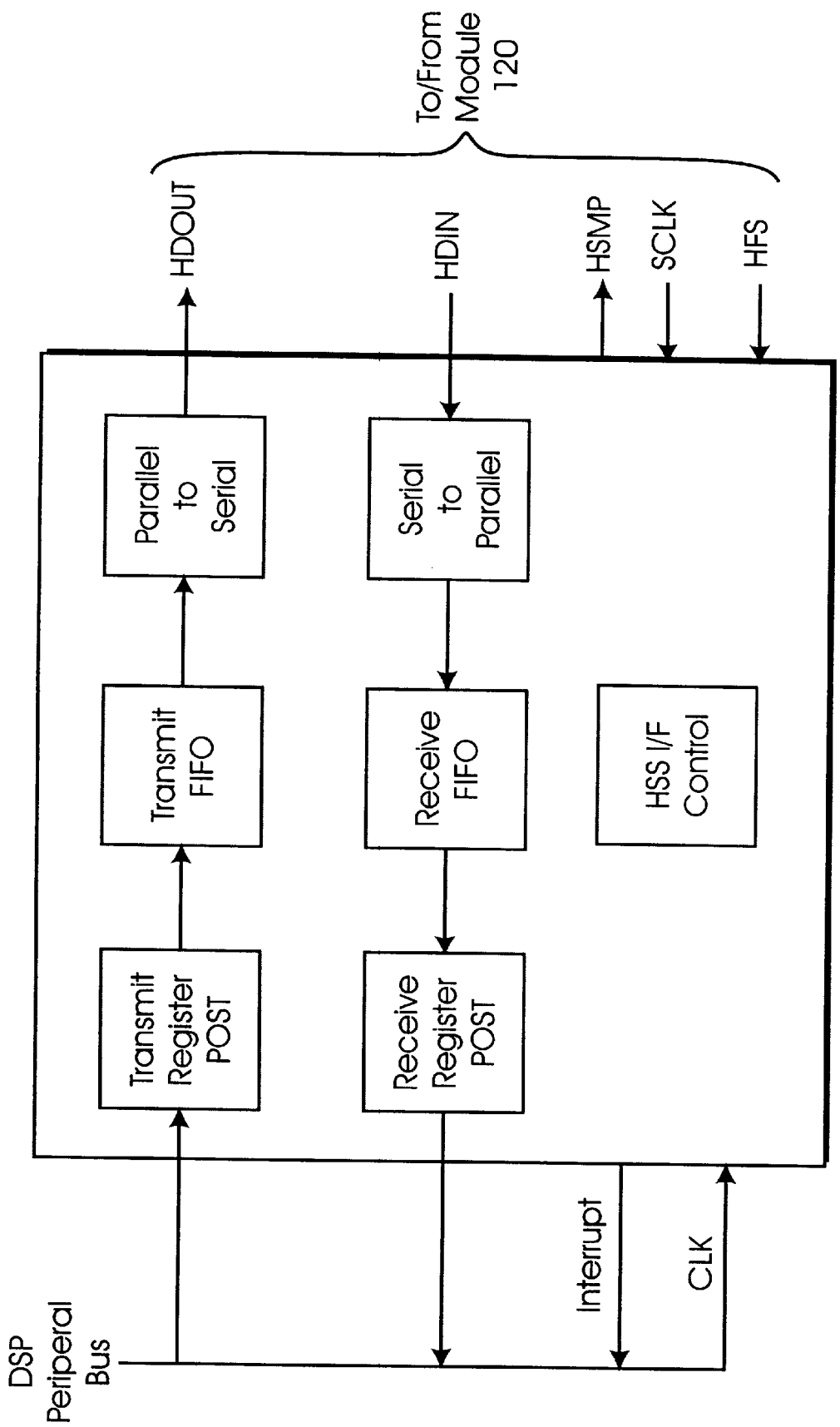
FIG. 10 shows a block diagram of one embodiment of HSS interface on subsystem 114.

(Note that "Type" defines the type of signal as seen by the subsystem 114). In an embodiment of the invention where a high speed serial channel is used as an AFE interface including modem codecs, the channel can operate according to either of two codec protocols, a short frame protocol or a long frame protocol, as shown in the timing diagrams provided at FIGS. 8 and 9, respectively. A more detailed diagram of such a high speed digital serial interface 334 in one embodiment of the subsystem 114 is shown in FIG. 10.

Mid-Speed Serial Channels 214, 215

The mid-speed serial channel 214 is used as a PCM codec interface in one embodiment of the invention in a manner that will be recognized by those of skill in the art. In such an embodiment, the signals for the mid-speed serial channel include the following:

| Signal Name | Type | Description |
| --- | --- | --- |
| CD$_{in}$ | I | codec Data in |
| CD$_{out}$ | O | codec data out |
| CCLK | O | codec clock |
| CFS0 | O | codec frame sync 0 |
| CFS1 | O | codec frame sync 1 |

Figure 11:
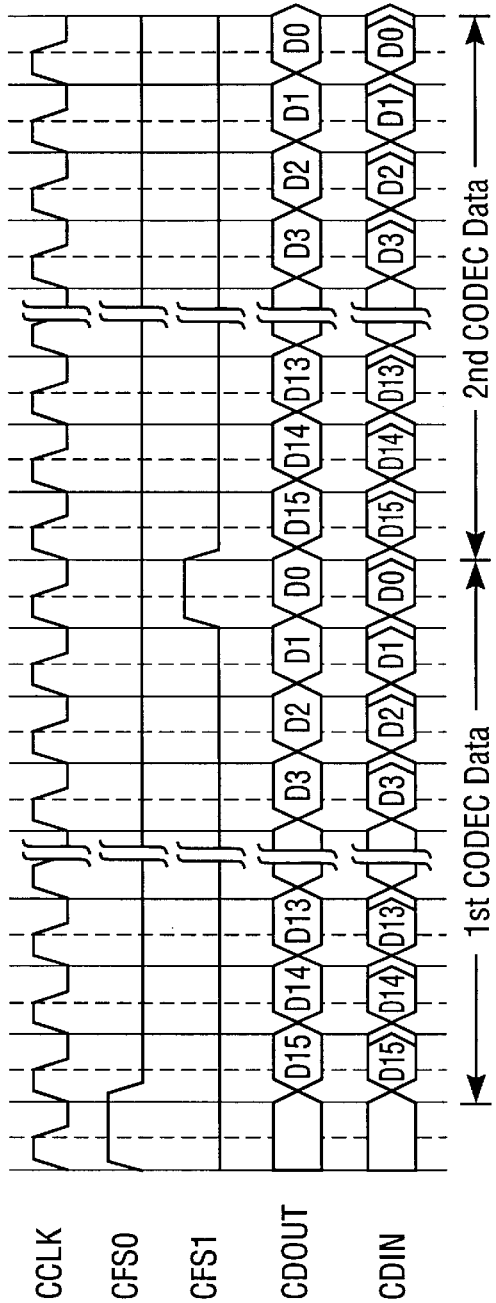
FIGS. 11–13 are timing diagrams showing the timing of various signals for one embodiment of an interface 118 in accordance with the invention.
Figure 12:
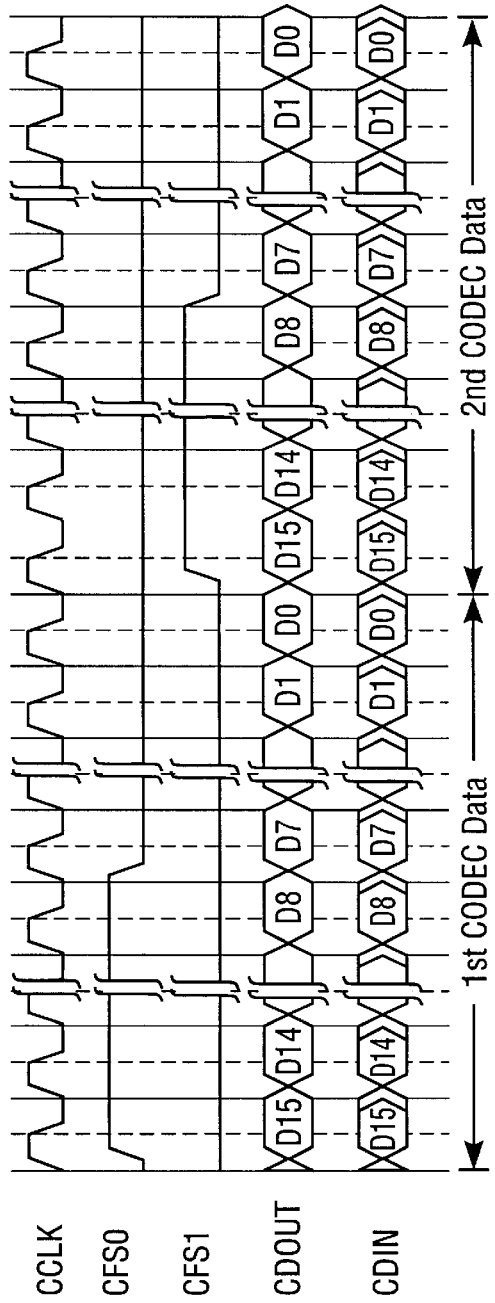

The signals listed above can be used to support one or two PCM devices. If using the interface to support only one PCM codec device, CFS1 is unused. If using the interface to support two PCM codec devices, CFS0 is coupled to the first device, while CFS1 is coupled to the second device (Both devices would be coupled to the remaining signals). Timing diagrams shown at FIGS. 11 and 12 are illustrative of the mid-speed serial channel signal's use, displaying a short frame protocol and a long frame protocol, respectively.

Figure 6:
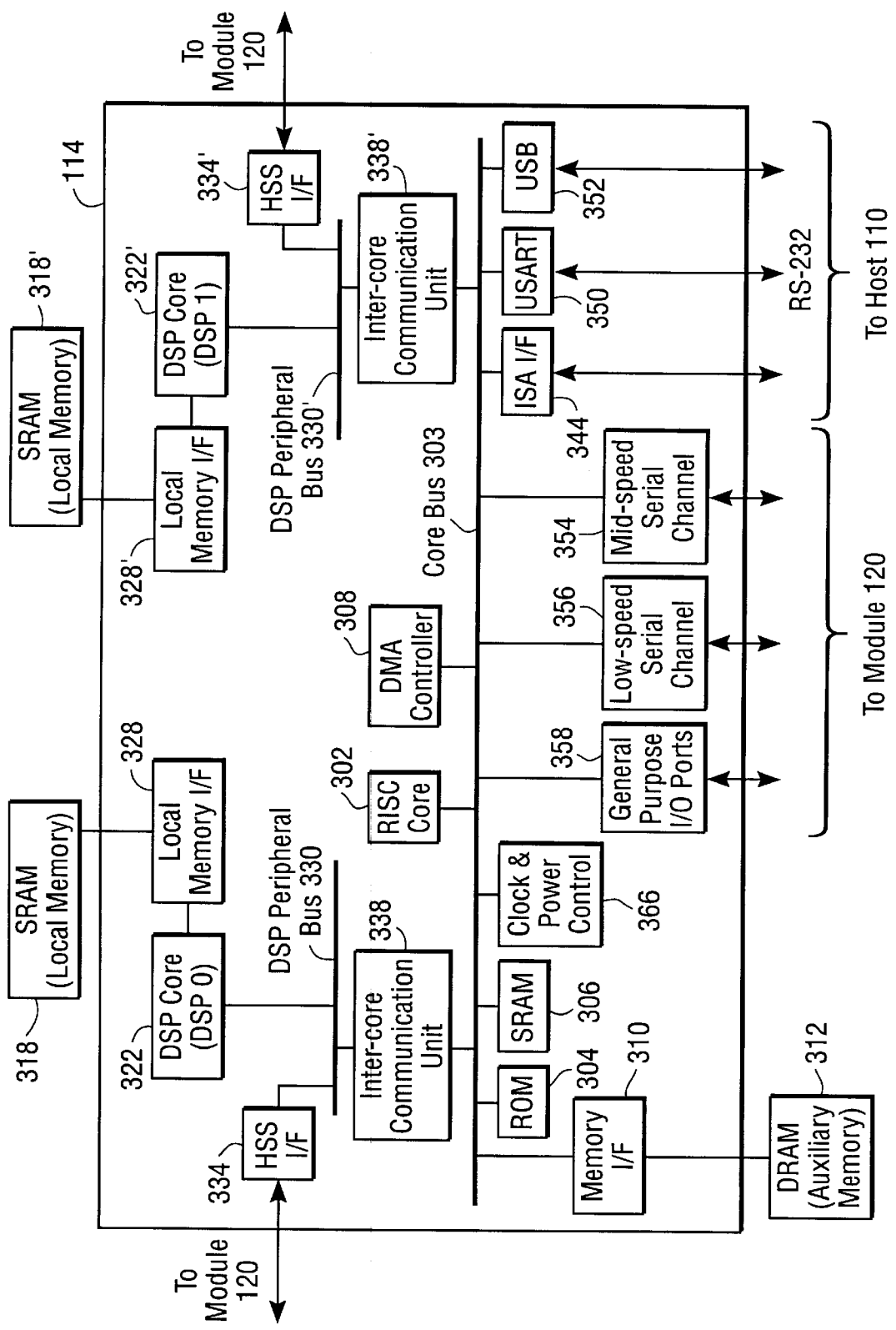
FIG. 6 is a generalized block diagram of one embodiment of a subsystem 114 and memory 116 in accordance with the invention.

In one embodiment of the invention, up to four PCM codec devices can be supported. The signals listed above are supported at the subsystem 114 by an interface unit 354 (FIG. 6). In embodiments supporting up to four PCM codec devices on a module 120, two interface units 354 are provided. Each unit includes the five signals listed above. The two units 354, however, are clock synchronized, so that the same signals are used by each unit for CLK, CFS0, and CFS1. Only one interface unit 354 generates the signals CLK, CFS0, and CFS1. Thus, when adding support for an additional two PCM codec devices, it is only necessary to add two signals to the mid-speed channel 214: a second D$_{in}$ signal and a second D$_{out}$ signal. It should be understood that support by the interface 118 for additional PCM codec devices could be easily added as described above, i.e., by adding additional data input and data output signals to the interface.

A second mid-speed serial channel 215 is shown in FIG. 5. Mid-speed serial channel 215 is designated in one embodiment in accordance with the AC 97 (Audio Codec 97) standard propounded by Intel Corp. and known to those of skill in the art. Details regarding AC97 can be found in "Audio Codec '97 Component Specification," Revision 1.03 (Sep. 15, 1996), and "Audio Code '97," Revision 2.0 (Sep. 29, 1997), both incorporated by reference herein. Both revisions can be found at http://developer.intel.com/pc-supp/platform/ac97/ at the time of this writing.

In some embodiments of interface 118, only one of the mid-speed serial channels 214 or 215 are included. In those embodiments where two or more mid-speed serial channels are provided, appropriate interface units 354 (FIG. 6) are provided. Other types of mid-speed serial channels could also be used in other embodiments.

Low-Speed Serial Channel 218

The low-speed serial channel is, in one embodiment, a Microwire™ interface, a synchronous serial communication interface standard that is generally known in the art ("Microwire" is a trademark of National Semiconductor Corporation). Typical devices that are designed to support the Microwire interface include certain EEPROMs and I/O expanders (particularly useful to aid in handling relays when general purpose I/O ports are insufficient). Signals included in the Microwire interface include:

| Signal Name | Type | Description |
| --- | --- | --- |
| MWSI | I | Microwire serial input |
| MWSK | O | Microwire serial clock |
| MWSO | O | Microwire serial output |
| CS2:0 | O | Microwire device select signals |

Figure 13:
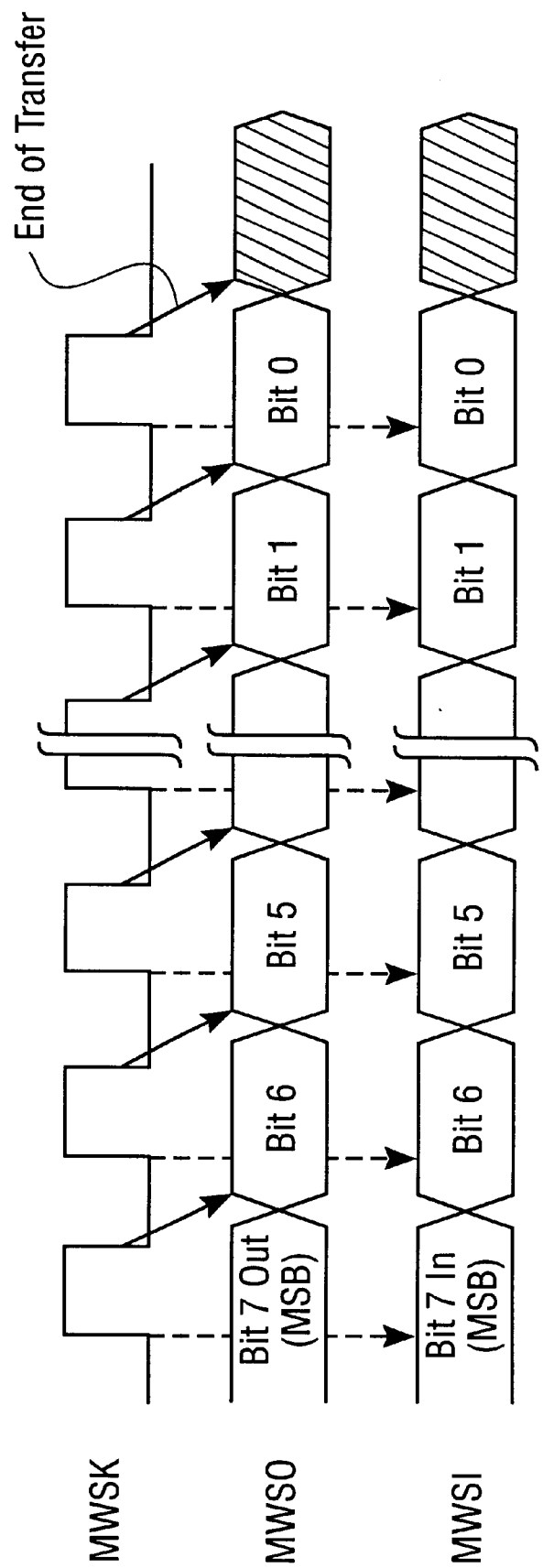

As shown in the timing diagrams in FIG. 13, serial data in is always sampled on one edge of the serial clock, while serial data out always changes on the other edge of the clock. Therefore, if serial data in is sampled on the rising clock edge, serial data out changes on the falling edge, and vice versa.

Generally only three signals, MWSI, MWSK, and MWSO, are required for Microwire devices. However, as shown, several devices can share a Microwire channel by adding device select signals, e.g., CS2:0, to the channel. CS0, in one embodiment of the invention, is always coupled to memory unit 124 on the module 120 (see FIG. 5), where memory unit 124 can be a ROM or serial Flash device in various embodiments of the invention. Memory unit 124 stores the function identifier for the module 120. When subsystem 114 is powered up, the subsystem reads, through the Microwire interface 218, the function identifier stored in memory 124. Thus, when a module 120 is coupled to the subsystem 114 through interface 118, CS0 is always coupled to memory 124 to enable reading of the function identifier.

More detailed documentation with respect to the Microwire interface is available from various publications from National Semiconductor Corporation. As will be recognized by those in the art, other embodiments of the invention may utilize a low speed serial channel interface other than the standardized Microwire interface.

General purpose IO ports 216

In FIG. 5, the interface 118 also includes channels to support general purpose IO ports (at the subsystem side), which are provided and can be used to provide additional support to any module attached. These general purpose I/0 ports are bidirectional and can be used to provide inputs, outputs, tri-state, or open drain signals. For instance, one I/O port could be used to signal "off-hook" in a telecommunications application of subsystem 114, while another port could be used to send a clock signal while still a third port could be used to generate interrupts to the RISC processor 302. As mentioned previously, I/O ports are also generally useful for providing relay signals, especially to DAA-type circuits.

Module Presence Indicator 222

Some embodiments of the invention include a module presence indicator 222 to indicate whether or not a module is present, allowing for "hot-swap" of modules (i.e., interchanging modules while subsystem 114 is receiving power). Some embodiments, where no hot-swap capability is provided, do not require presence indicator 222. Still other embodiments could check for the presence of a module 120 by periodically polling the low speed serial channel 218 (e.g., Microwire) for the presence of a function identifier and would also not require a presence indicator 222.

First Embodiment of Subsystem

A first embodiment of subsystem 114 coupled to memory pool 116, which includes SRAM 318, 318' and DRAM 312, is shown in FIG. 6. In the embodiment of subsystem 114 shown in FIG. 6, the subsystem 114 includes a RISC processor core 302, two DSP cores 322, 322', small memory units 304, 306, and a variety of peripherals and interfaces that make it suitable for many communications and multimedia system configurations. In one embodiment, subsystem 114 is a single integrated circuit. Each of the elements included in the embodiment of subsystem 114 shown in FIG. 6 is described in more detail below.

RISC Processor 302

RISC processor 302 is a general purpose 32-bit microprocessor core with a RISC architecture and is responsible for arithmetic and logic operations as well as program control in subsystem 114. In one embodiment, this RISC processor 302 is a CR32A available from National Semiconductor Corporation. The CR32A is fully described in the CompactRISC CR32A Programmer's Reference Manual, Version 1.1 (Feb. 1997) available from National Semiconductor Corporation, and incorporated herein by reference. In other embodiments, a different microprocessor can be used that is not necessarily a RISC processor.

ROM 304, SRAM 306, DMA Controller 308, Interface 310, and DRAM 312

RISC core 302 is primarily associated with a memory pool of various memory devices including ROM 304, SRAM 306, and DRAM 312, and RISC core 302 has access to these devices via core bus 303. ROM 304 is a small non-volatile memory, which is approximately 4–8 Kbytes in one embodiment of the invention. ROM 304 includes a small amount of start-up code (or "boot code") to enable subsystem 114 to obtain the program code required to operate the subsystem. In one embodiment, ROM 304 stores instructions that allow the identification of the presence and type of an off-sub-system memory device, e.g., an EEPROM. The ROM also stores instructions for reading code stored in the off-sub-system memory device, which separately stores instructions on how to obtain the function identifier from the module 120 and how to obtain function-defining program code corresponding to the function identifier. In other embodiments, the ROM 304 itself stores instructions for obtaining the function identifier from the module 120 and upon receipt of the function identifier, to obtain code to define the function of subsystem 114. The function-defining code is obtained either from host 110 or from another external memory device, e.g., a serial flash memory device located on the module 120.

Once obtained, the function-defining code is placed in DRAM 312, which interfaces to subsystem 114 through memory interface unit 310. In one embodiment, DRAM 312 is approximately 1M×16. In other embodiments, DRAM 312 is approximately 256K×16. The memory interface unit 310 generally handles timing and rate changes between the core bus and the DRAM, including those due to varying bus widths (e.g., in one embodiment the core bus is 32 bits wide while the DRAM can only be accessed 16 bits at a time). The memory interface unit 310 further handles RAS and CAS, as is known in the art. Moreover, the memory interface unit 310 can also interface to other I/O devices and can distinguish between DRAM addresses and I/O addresses. Memory interface unit 310 is also sometimes referred to herein as an "auxiliary memory interface," while DRAM 312 is sometimes referred to as an "auxiliary memory."

Because DRAM can only be accessed, in one embodiment, at a slower speed than that at which the RISC core runs, SRAM 306 is provided. In one embodiment, SRAM 306 is 6 Kbytes and is accessible at the RISC processor speed. In other words, each SRAM read or write operation is one cycle long and does not include any wait states. Thus, SRAM 306 is useful for running small routines.

DMA controller 308 transfers data between various devices (e.g., DRAM) with minimal RISC 302 intervention. DMA controllers are generally known by those of skill in the art.

Although SRAM and DRAM are specifically discussed, other types of memory could also be utilized in other embodiments of the invention. For instance, instead of DRAM 312 an SRAM-type memory or even a disk drive could be utilized.

DSPs

Subsystem 114 as shown in FIG. 3, includes two DSP cores 322 and 322'. In the embodiments shown in FIG. 3, each DSP core 322 and 322' is identical to one another. Thus any reference made to only one of the DSPs or surrounding DSP structures applies equally to the other unless stated otherwise.

In one embodiment, each DSP core 322, 322' is designed in accordance with a Harvard architecture DSP and is compatible with Texas Instruments TMS320C5x family of DSPs. Each DSP core 322 may perform a separate capability (e.g., one performs a modem capability and one performs a speakerphone capability) or the DSP cores can work together to perform a single capability.

Each DSP core 322, 322' is also primarily associated with local memory (e.g., SRAM) 318, 318', respectively. The respective DSP cores 322, 322' each interface to respective local memory units 318, 318' via a respective local memory interface 328, 328', which are generally understood by those of skill in the art. Each SRAM 318, 318' stores code for performing DSP functions for the corresponding DSP core, 322, 322'. Although SRAM is used for local memory units 318, 318', other embodiments may utilize other types of memory structures and the invention should not be construed as being limited to SRAM as local memory.

Each DSP 322, 322' is respectively coupled to a respective DSP peripheral bus 330, 330'. Each DSP peripheral bus 330, 330' is further respectively coupled to a respective high speed serial (HSS) interface 334, 334' and a respective intercore communication unit (ICCU) 338, 338'.

The HSS interface unit 334 will be best understood by reference to the HSS channels previously described with respect to interface 118.

ICCU

Each ICCU 338, 338' couples a respective DSP core 322, 322' to the core bus 303, and in doing so allows:

1. each DSP core 322, 322' to access to core bus 303, which in turn permits (a) the sending of messages from each DSP core 322, 322' to the RISC core 302, (b) the sending of messages between the DSP cores 322, 322', and (c) the access by each DSP core 322, 322' to the DRAM 312; and
2. the RISC core to access each DSP peripheral bus 330, 330', which in turn permits the RISC core 302 to access each SRAM 318, 318'.

In other words, the processor cores 302, 322, and 322' can share information in their respective memory spaces and transfer messages between one another. Because the ICCUs 338, 338' are identical, reference made to one applies in a similar manner to the other unless otherwise stated.

Figure 14A:
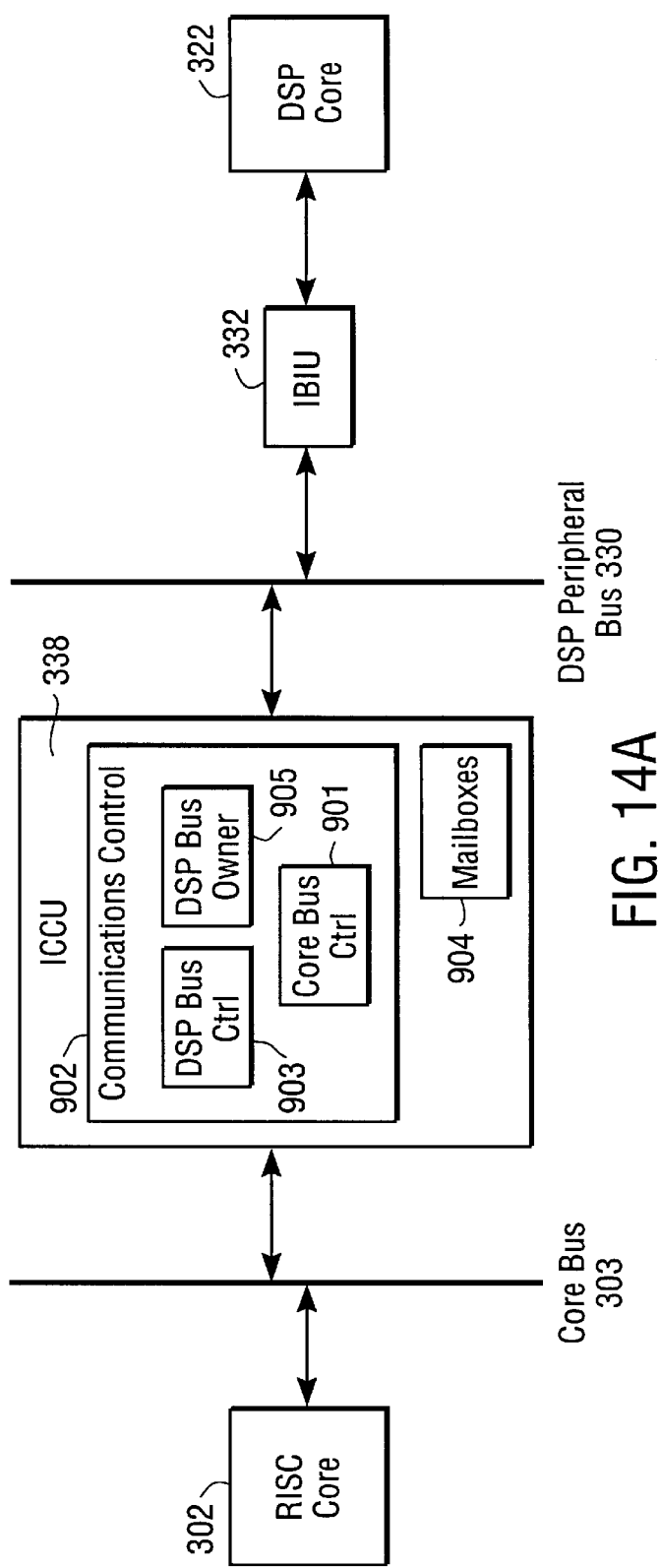
FIG. 14a shows a generalized block diagram of an ICCU 338 in accordance with the invention.

Referring to FIG. 14a, to share memory, when a DSP core 322 needs to access an address in the RISC core address space, the DSP core 322 writes to the communication control unit 902 of the ICCU. The ICCU 338 makes necessary translations to the address (e.g., adjusts for variations caused by differences in bus width) and arbitrates for ownership of the core bus via core bus control unit 901 as is generally known in the art. When ownership is granted, the ICCU becomes a bus master and performs the requested access. Thus, in effect, the ICCU 338 serves as a bridge from the DSP peripheral bus 330 to the core bus 303.

Likewise, the RISC core 302 accesses DSP address space through the ICCU 338. To do so, the RISC core requests control of the DSP peripheral bus 330 and does so by writing to a bus control register 903 in the communication control unit 902. Once access is granted, via an indicator placed in a bit of the bus control register 903, the ICCU 338 translates the address and performs the requested access in the DSP address space. Such an access can be either for a single access or for continuous control (for instance, during a code download to the SRAM). A bus control register 903 in one embodiment of the invention is byte-wide and a description of the bits is shown below:

Bus Control Register 903

| Bit Name | Description |
| --- | --- |
| Bit 0: HOLD | Hold Request. When set, requests the DSP core bus to be put on hold for one RISC core access, enabling the RISC to access the DSP memory space. When access is complete, the HOLD field is cleared to 0. |
| Bit 1: CHOLD | Continuous Hold Request. When set, requests the DSP core bus to be put on hold for as long as the bit is set. This enables the RISC core to access the DSP address space. To clear the bit, the RISC writes a 0 to it. |
| Bit 2: HOLDA | Hold Acknowledge. When set, indicates that a hold request was acknowledged, and DSP core execution halted, and the RISC can access DSP busses. |
| Bit 3: RST | Reset. When set, puts the DSP in reset. When cleared, enables the DSP to execute. |
| Bit 4: CWPS | Communication Window Program Select. When set, allows booting the DSP from a memory connected to the core bus. |
| Bit 5: STPCLK | Stop DSP Clock. When set, this signal stops the DSP's clocks. |
| Bit 6: HERR | Hold error. When set, indicates that either that there was an attempt to access the DSP memory while there is no HOLD acknowledge or its clocks are stopped. |
| Bit 7 | not used/reserved |

To prevent contention on the DSP busses, the ICCU also arbitrates access by the RISC core 302 and the other DSP core 322' to the DSP 322's address space. To do so, the ICCU includes, in one embodiment, a byte-wide bus owner register 905 in the communication control unit 902. When no device is accessing the DSP memory space, the register holds 1111 in its low four bits. When a device desires to access the DSP memory space, the device writes a device identifier (four bits, in one embodiment) into the low four bits of the register 905. As long as the low four bits of the bus owner register 905 indicate anything other than 1111, no other devices can access the DSP resources. When the accessing device finishes, the device writes 1111 to the low four bits of the bus owner register to release the DSP resources for use by other devices.

Thus, when an access is desired to the DSP memory space by the RISC or by the other DSP unit, the following steps will be performed:

1) the requesting device writes its identification number to the bus owner register 905 in the ICCU;
2) if the bus owner register 905 reflects the requesting device's identification number, then the requesting device has been given priority access rights. If the bus owner register 905 does not reflect the requesting device's identification number, another device has ownership rights and the requesting device will have to try again later.

3) Once given ownership rights by the bus owner register 905, the requesting device writes to either the HOLD or CHOLD bit of the bus control register 903.

4) The requesting device waits for HOLDA to reflect that access to the bus has been granted.

5) The requesting device performs its required accesses (via the ICCU acting as a translator).

6) If HOLD was written to, it is cleared after the required access is complete and the DSP resources are released. If CHOLD was written to, the requesting device must clear that bit of the register to release the DSP resources.

7) The requesting device writes 1111 to the low four bits of the bus owner register 905.

The ICCU 338 further includes a mailbox mechanism 904 to enable certain messaging between the cores. Such a mailbox mechanism enables the transfer of byte-wide messages, generally high priority data or control information that requires immediate attention. Such a system generally consists of at least two mailboxes, one mailbox for messages from the RISC to the DSP and one mailbox for messages from the DSP to the RISC. Each mailbox comprises a register in the ICCU 338. When information is written to a mailbox, an interrupt is generated to the receiving core. Other embodiments of the invention may allow for the sending of messages via mailboxes of lengths other than one byte wide.

Figure 14B:
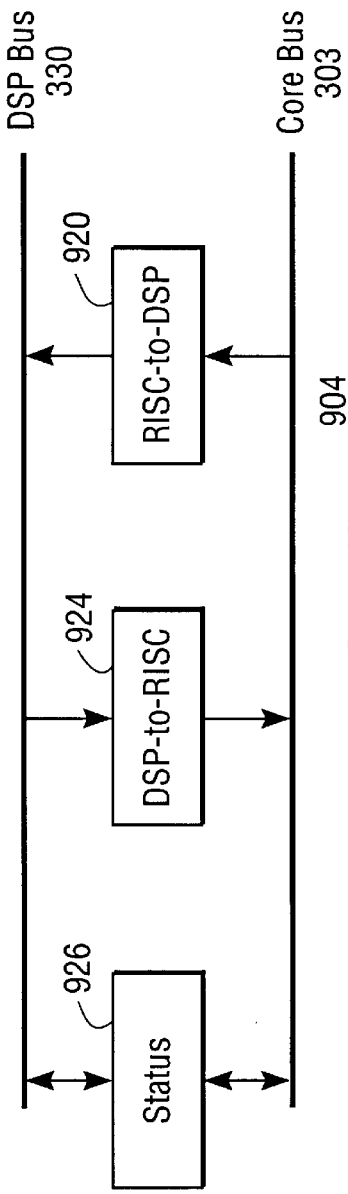
FIG. 14b shows a generalized block diagram of a mailbox mechanism of ICCU 338 in one embodiment of the invention.

More specifically and referring to FIG. 14*b,* when the RISC wants to send a high-priority message to the DSP core, the RISC writes the message to a RISC-to-DSP message register 920. When the message is written, the RISC also writes a bit to a Mailbox-status register 922 to indicate that the RISC-to-DSP message register is full. The status register is mapped to the memory space of both the DSP core and the RISC core. At the same time, an interrupt is generated to the DSP core to indicate that a message is in the DSP's mailbox. The DSP core will read the message in the RISC-to-DSP message register 920. When the message is read, the flag in the mailbox-status register indicating the presence of a message is cleared. Similarly, when the DSP needs to send a message to the RISC, the DSP writes to a DSP-to-RISC message register 924 and sets a bit in the status register 922 indicating the register is full. An interrupt is generated to the RISC, which in turn reads the message and clears the bit that indicates the mailbox is full.

Host Interface

The subsystem 114 communicates with host 110, in one embodiment, selectively through one of three distinct interfaces:

1. ISA interface 344, which is generally for use when subsystem 114 is an internal PC-add-in card;
2. a USART interface 350 which interfaces to a serial RS-232 line; and
3. a USB interface 352.

Each of these interfaces is generally well known in the art. Other embodiments of the invention could select different host interfaces and can vary the number of different interfaces provided for selection. Some embodiments of the invention may even only provide one host interface, without selection among others.

Mid-Speed Serial Channel Interface 354, Low Speed Serial Channel Interface 356, I/O Ports 358

Mid-Speed serial channel interface unit 354, low speed serial channel interface unit 356, and I/O ports 358 are best understood with reference to interface 118 as described above. Each of these units serves to aid in interfacing subsystem 114 to module 120.

Clock and Power Control Unit 366

Clock and power control unit 366 provides for clock generation and for power management. Unit 366 generates a main system clock using a crystal resonator. Clock and power control unit 366 further provides a second clock source from a second crystal for USB bus support as is understood in the art. The clock and power control unit can further generate other clock signals, including a low frequency clock (used for power management) from the main clock by dividing the frequency.

Clock and power control unit 366 also manages system power resources by adjusting power consumption to various levels, including an access mode, a low power (or power save) mode, and a halt mode. The access mode occurs when the system is powered-up and actively performing signal processing functions. The low power mode, or "power save mode," permits the subsystem 114 to operate at a low frequency, utilizing the low frequency clock. Halt mode disables clocks and places subsystem 114 in a minimum power consumption mode, in which minimum power is consumed but state information (memory stored in registers) is not lost.

Other Peripherals

In addition to those described, other peripheral units may be coupled to bus 303. Such peripherals may include watchdog, timer, interrupt, and/or reset units. Moreover, a separate peripheral bus may be provided in the same embodiments of the invention, where the peripherals are coupled to the peripheral bus instead of directly to the core bus. In such embodiments, the core bus and peripheral bus may be coupled using an adapter.

Operation of Embodiment of FIG. 6

Referring again to FIG. 6, in operation, upon power-up of subsystem 114, the subsystem will engage in a boot sequence stored in ROM 304. The boot sequence will, either directly or indirectly (e.g., via an off-sub-system EEPROM), result in instructing the RISC core 302 to query module 120, and particularly memory unit 124, through the low speed serial interface 356 for the function identifier stored on module 120. Upon receiving the function identifier, the RISC core 302 queries host 110 through one of the alternative host interfaces (e.g., ISA, USART, or USB) for code that characterizes the operational function of subsystem 114. Appropriate code corresponding to the function identifier is then downloaded from the host and placed in DRAM 312. The code placed in DRAM 312 includes code for execution by both the RISC and the DSP processors. In an alternative embodiment, the memory unit 124 will include a Serial FLASH or Serial EEPROM and the code will be downloaded with the finction identifier directly from module 120. In still other embodiments, finction code will be stored in a memory device, e.g., a serial FLASH, serial EEPROM, or other memory device, that is located off of the subsystem and apart from the module and the RISC upon obtaining the function identifier will download the code from the memory device into DRAM 312.

Once code is downloaded and stored in DRAM 312, ROM 304 initiates the start of such code on the RISC, where the code run on the RISC includes an operating system (OS) as well as a functional application code. The RISC core 302 then causes the distribution from DRAM 312 to the DSP SRAMs 318 and 318' (via the respective ICCU's 338) of at least the DSP OS and initial task or code module to be executed by the DSP. In some embodiments, the distribution of code to the DSP SRAMs does not occur until the system is ready to enter an active communication state, so that no code is stored in SRAMs 318, 318' when the system is idle. The rest of subsystem 114, including I/O ports, is configured at the direction of the RISC for the particular function the subsystem 114 is to perform.

As referred to above, the software to be run by the DSPs is distributed from the RISC DRAM 312 into the respective DSP SRAMs 318, 318'. The first code module transfer is done under the control of the RISC core 302. However, the DSP is not required to have a complete set of function code to perform the desired function. Rather the DSP functional code is divided into tasks or code modules where additional tasks or code modules can be downloaded into the DSP SRAM subsequently. Such subsequent downloads may be initiated by software running on the DSP core 322 or by software running on the RISC core 302. Code distribution to the DSPs will be described in more detail subsequently.

Second Embodiment of Subsystem

Figure 7:
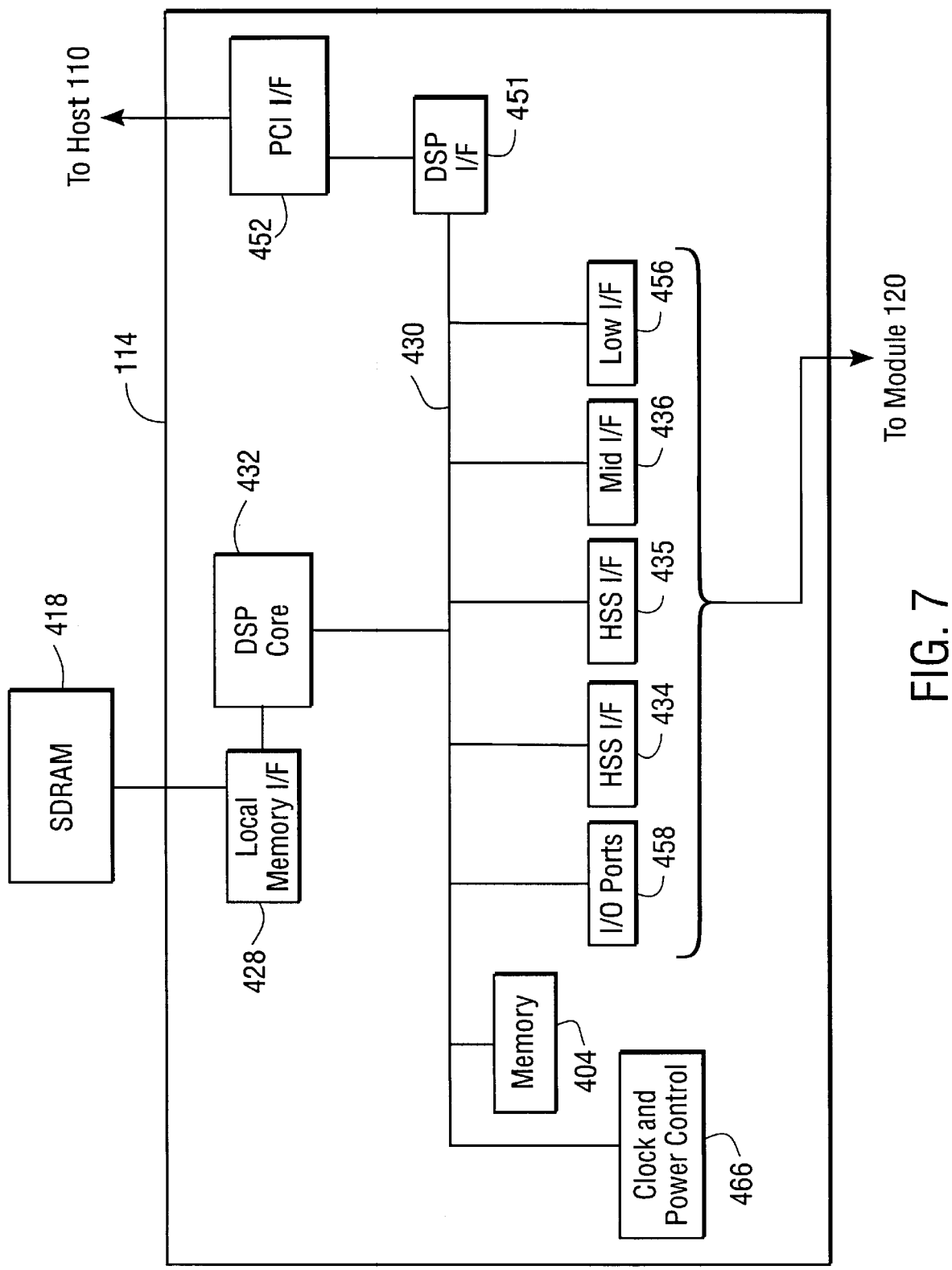
FIG. 7 is a generalized block diagram of a second embodiment of a subsystem 114 and memory 116 in accordance with the invention.

A second embodiment of subsystem 114 in accordance with the invention is shown in FIG. 7. As shown, the embodiment of FIG. 4 includes a DSP core 432, but does not utilize a RISC core 302. Instead, processing functions that would require the RISC core 302 of FIG. 6 are performed by the host processor in host system 110. Like the embodiment of FIG. 6, some embodiments of a subsystem similar to that shown in FIG. 7 will be implemented on a single piece of silicon.

The embodiment of subsystem 114 shown in FIG. 7 includes a DSP core 432, similar to that described with respect to the embodiment of FIG. 6. In addition, in a similar manner to that shown and described with respect to FIG. 6, the DSP 432 interfaces to external SRAM 418 (or other type of local memory) through a local memory interface 428. The DSP core 432 is also coupled to high speed digital serial interfaces 434–436, as well as I/O ports 458, and Microwire (or other low speed) interface 456. Each of the I/O ports 458, high speed interfaces 434–436, and Microwire interface 456 will be coupled to a module 120. In addition, like the embodiment described with respect to FIG. 6, the subsystem of FIG. 7 will also include a clock and power control unit 466. Other peripherals could also be coupled to bus 430. The subsystem of FIG. 7 further includes a memory unit 404 that may include in various embodiments ROM and RAM.

Unlike the embodiment shown in FIG. 6, however, the embodiment of subsystem 114 of FIG. 7 has a single DSP 432, which is coupled via bus 430 to DSP interface 451. In the embodiment shown in FIG. 7, a PCI interface 452 is used to interface with the host. PCI interface 452 is coupled to DSP interface unit 451 (similar, in some embodiments, to ICCU 338 of FIG. 6). Other embodiments can alternatively include an ISA interface, an LPC interface, or other host interfaces known in the art, or can include several selectable interfaces. In FIG. 7, since the host processor and host memory are serving the same functions as the RISC and DRAM of FIG. 6, the host interface serves in FIG. 7 as an auxiliary memory interface as well. Although subsystem 114 as shown in FIG. 7 only contains a single DSP 432, subsystem 114 may still in some embodiments be able to perform functions with multiple capabilities (e.g., modem and speakerphone). While such tasks may be split or shared by the DSP support units in FIG. 6, they would all be handled by DSP support unit 414 in FIG. 7. Thus, in some embodiments, DSP core 432 in FIG. 7 is more powerful than either of DSP core's 322, 322' alone in FIG. 6.

Operation of Embodiment of FIG. 7

In FIG. 7, when subsystem 114 is powered-up, memory 404 provides the initial boot sequence. The boot sequence, directly or indirectly, causes the DSP core to obtain the function identifier from memory 124 on module 120. Upon receiving the function identifier, subsystem 114 transmits the function identifier to the host 110. The host 110 selects appropriate code which corresponds to the function identifier and maintains the code in host memory in a similar manner to maintaining the code in DRAM as described with respect to FIG. 6. The host downloads and distributes appropriate modules of the code to the SRAM 418 in a manner similar to that performed by RISC core 302 in FIG. 6. The operation of FIG. 7 is in fact similar to FIG. 6 except that the host processor 121 has assumed most of the functions of the RISC processor.

Shared Memory

The RISC core and DSP can share memory resources, e.g., can share DRAM and SRAM resources (of FIG. 6) and thus, in effect, the system of FIG. 6 has a distributed unified memory pool. In order for the DSP to access memory resources primarily associated with the RISC, or vice versa, however, time is required in translating the respective addresses and in requesting and receiving access to the respective bus. For instance, because the DSP is word addressable (i.e., 16 bits at a time) while the RISC core can address memory in different size pieces (e.g., 8-bit, 16-bit, and 32-bit), the ICCU spends time translating the addresses into the appropriate bus format before requesting bus access. Thus, to speed up the access process, both in address translation time as well as saving clock cycles in order to become a bus master, memory mapping is used. While the following discussion is made with reference to FIG. 6, it will apply in a similar manner to the embodiment of FIG. 7 (sharing host memory resources and DSP memory resources).

Figure 15:
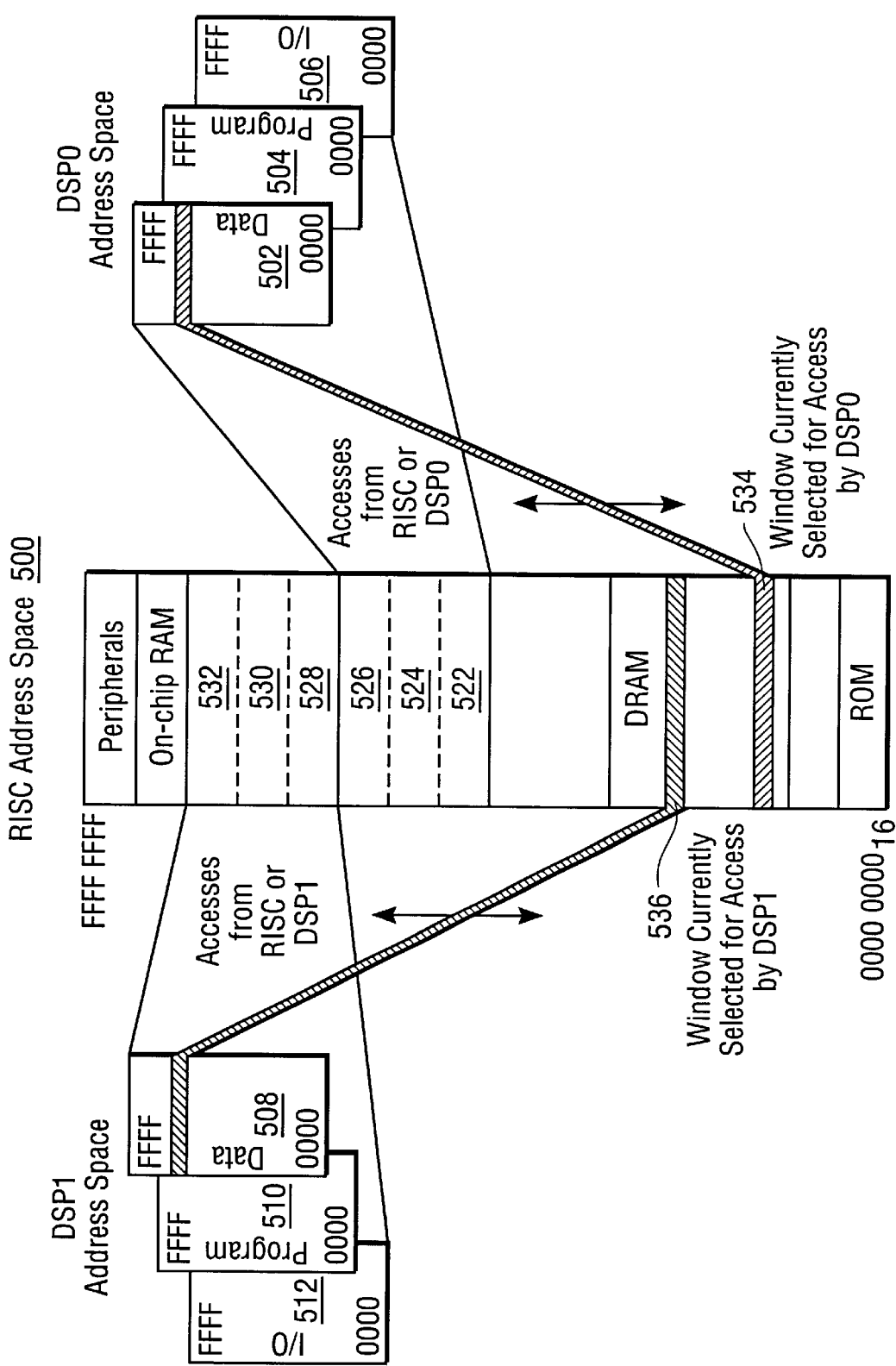
FIG. 15 shows a generalized block diagram of the RISC and DSP address spaces in accordance with one embodiment of the invention.

The memory space primarily associated with the DSP includes separate data, program, and I/O memory spaces (each of 64K words) in accordance with a Harvard architecture. Each of these memory spaces is mapped to a location in the RISC memory space so that there is a respective address in the RISC memory space associated with each of the DSP data, program and I/O memory spaces. A representational diagram of the RISC memory space 500 is shown in FIG. 15 and shows the addressable memory space (data 502, program 504, and I/O 506) for DSP core 322 (DSP0) mapped into locations 522, 524, and 526 in the RISC address space. Likewise the data 508, program 510, and I/O 512 for DSP core 322' (DSP1) is mapped into the RISC address space 500 at locations 528, 530, and 532, respectively.

In addition, a 2K consecutively addressable portion of the RISC memory is assigned a location in the DSP memory space. For instance, in FIG. 15, 2K location 534 is mapped into DSP0 data memory space 502. Likewise, 2K location 536 is mapped into DSP1 data memory space 508. Other embodiments of the invention may map this information into program or I/O address space of the respective DSP memory space. Moreover, this 2K window is "sliding", i.e., the exact 2K window can be varied. In other words, each DSP has access to all of the RISC memory space, but only 2K at a time is mapped into the DSP memory.

Thus, memory resources for one processor are effectively "buffered," or "cached," by another processor, allowing each processor access to the other respective processor's memory resources at the accessing processor's own respective bus access speed. If, for instance, such a "cache" zone were not created in the DSP memory space, and if the DSP needed to access the RISC memory space, it would have to request access to the core bus 303, and then wait to be granted access. Next, it would request performance of a DMA transfer, which could take as many as seven core bus clock cycles or more just to read the information. But, by placing a portion of the information stored in RISC memory into DSP memory, the DSP has immediate access to that information.

Unlike a traditional memory caching, however, which results in a fragmented cache, i.e., one where addresses are not stored sequentially (since instructions are cached as called), the memory sharing system of the present invention buffers an entire contiguously addressable 2K zone of RISC memory into the DSP memory. In other words, the present invention buffers a start address, an end address, and all addresses in between. Such is done since instructions are often accessed in a sequential manner. Such sequential caching results in fewer misses when the cached region is accessed.

Further, not only does each processor have read access to the cached information, but it can also write to the buffered windows of information, hence the buffered information must be updated. In order to keep the respective mapped memory locations updated, bits (in both the buffered locations and the regular processor memory space) that are changed are tagged. The ICCU monitors the tagged bits, and when bits are tagged, the ICCU requests core bus access. Upon an access grant, the ICCU initiates a sequence, e.g., a DMA transfer, to update the bits in the RISC memory space. Similarly, when buffered bits of DSP memory in the RISC memory space, or the 2K window buffered in the DSP memory space are written to by the RISC or other device, these bits are also tagged in the RISC memory space. The ICCU is notified, and will request access to the DSP memory resources to update the information. Thus, the processors write cycles do not need to be delayed to wait for access to the respective busses (DSP bus or core bus). In fact, by using such a memory mapping technique, the processors will have access to the memory spaces of other processors independent of timing requirements, load requirements or availability of memory space of the various memories and processors. Memory is thus shared in an autonomous and load balanced manner.

If the 2K window of the RISC memory buffered in the DSP memory is not the 2K window needed, then the window is shifted, i.e., a new 2K window is buffered into the DSP memory resources, by utilizing the ICCU. In one embodiment, to shift the 2K window, the DSP can send a request to the RISC for a new 2K window. The RISC will then assert a "continuous hold request" to control the DSP peripheral bus, as described previously, and then the RISC will copy the 2K window from DRAM 312 to SRAM 318.

Further, DSP core 322 can access the memory space of DSP core 322' by requesting access to the ICCU of DSP core 1 address space and vice versa.

All of the above-described memory sharing techniques take place in accordance with instructions stored on the DRAM and/or SRAMs.

Dynamic Load of DSP Code

As discussed above with reference to the operation of the embodiment of FIG. 6 (and similarly applicable to the embodiment of FIG. 7), not all code to be used by the DSP needs to be loaded into the respective DSP SRAM simultaneously. In fact, an embodiment of the present invention utilizes a system for dynamically loading DSP code during concurrent DSP execution.

Figure 16:
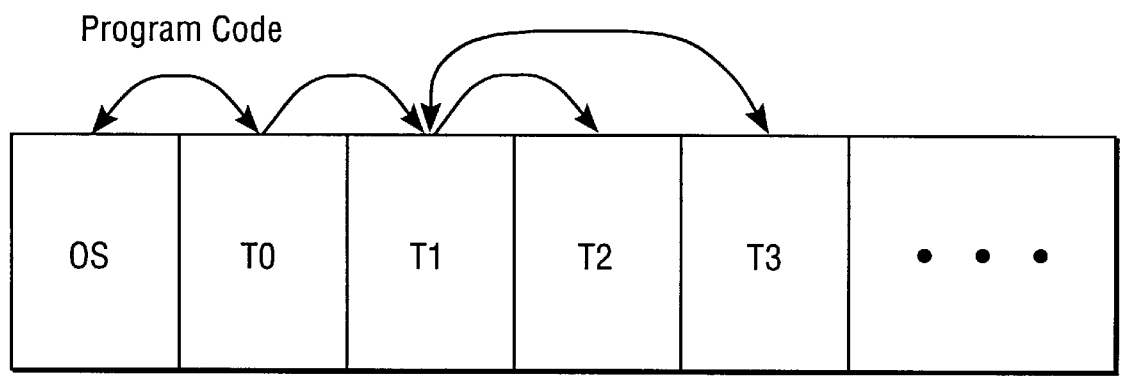
FIG. 16 shows a block diagram of program code to be executed by a DSP and the order in which code modules might be performed by the DSP.

As shown in FIG. 16, code to be run by the DSP is divided into task code modules (OS, T0, T1 . . . ). The DSP will typically run the code modules in a sequence, which may vary according to the functions performed. For instance, after performing some operating system (OS) tasks, in performing a particular function the DSP may need to run task T0 as shown in FIG. 16. When the task T0 has been completed, code in the OS may again be run and then subsequently the code module for T1 may be executed. Depending on the circumstances, however, T1 may be selectively followed by tasks T2 or T3. However, if performing a different function, or even in the same function, tasks may be executed in a different order or completely different tasks may be performed.

Figure 17:
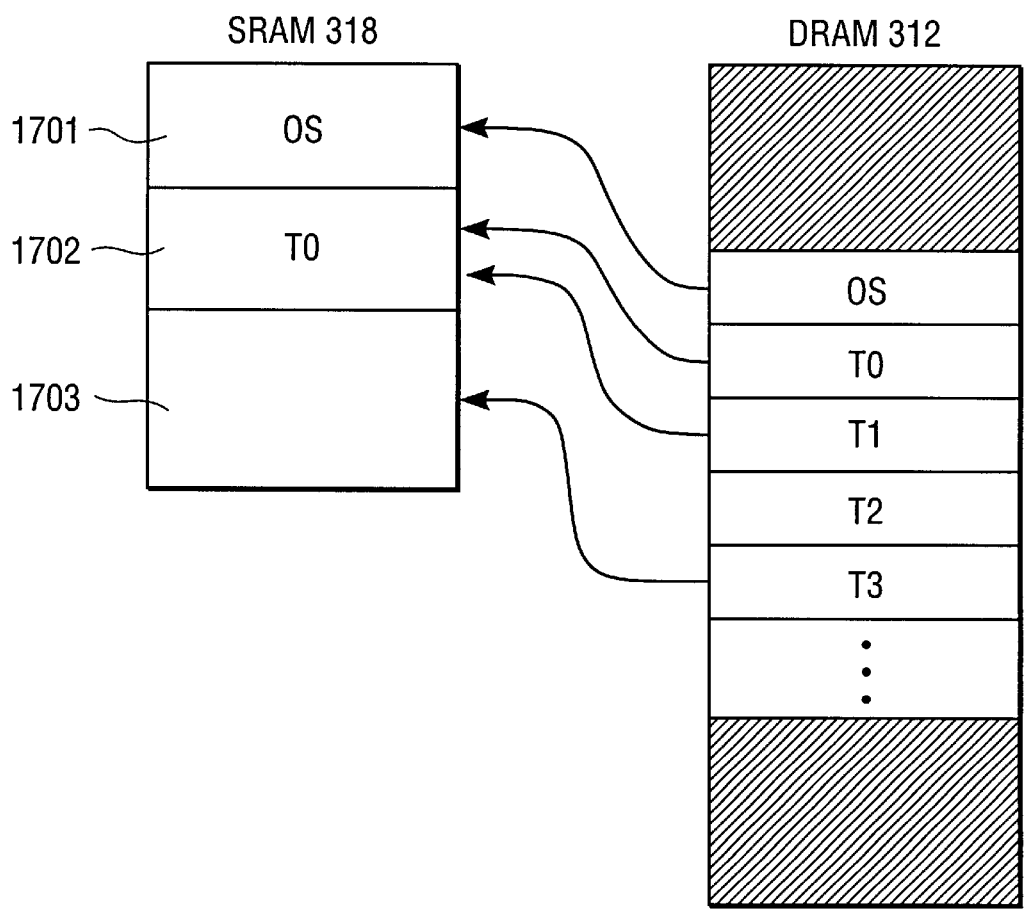
FIG. 17 illustrates the dynamic loading of tasks into the DSP memory space in accordance with one embodiment of the invention.

Traditionally, in signal processing systems, all code required by the DSP to perform all possible tasks for a desired function is stored in the DSP memory, e.g., SRAM. In one embodiment of the present invention, however, to reduce SRAM size, various code modules for different tasks are loaded into the DSP memory on an as-needed basis. The DSP function code is stored in DRAM 312 until needed. For instance, as shown in FIG. 17, the DSP SRAM 318 may be initially loaded with operating system code in memory location 1701 as well as task code module T0 in memory location 1702. Upon execution, T0 may, for instance, instruct the OS to perform certain steps, e.g., to generate tones for dialing, at which time the T0 task will have ended. If the T1 task is the code module to next be utilized, while the OS is performing the steps instructed by T0, e.g., tone generation, task code module T1 is loaded from DRAM 312 into the DSP memory location 1702, which formerly housed T0. When the OS finishes its task, the TI task is executed. While T1 is running, it may become apparent that the next code module required to be executed after T1 is the code module for the T3 task. So while T1 continues to run, T3 is loaded from DRAM 312 into DSP memory location 1703. When the T1 task completes, then the T3 task will be executed. Once T3 is executed, the memory space 1702 formerly occupied by T1 can be used either as data space for the T3 task or to house a future piece of code which will be dynamically loaded when required. Thus, when loaded into the SRAM, code modules can replace code modules that are no longer being used or, if code modules are still being used, placed in a distinct memory location.

Such dynamic code downloading can be under the control of the DSP 322 or under control of the RISC processor 302. If under control of the RISC processor, the RISC determines the next code module to load according to various messages sent by the DSP. The messages will give the RISC an indication of the DSP status. The RISC will further instruct the DSP that, when processing allows, the DSP should proceed to a "wait" loop of code. Once the DSP enters the "wait" loop, the DSP will remain in a wait state until a designated event occurs, e.g., a signal from the RISC to exit the loop. The DSP will also signal the RISC that the DSP has entered a wait state. Once the RISC has selected the next appropriate code module and once the DSP has entered a wait state, the RISC asserts control of the DSP peripheral bus with a "continuous hold request," as previously described, and copies the selected code module from the DRAM 312 into SRAM 318.

Because DSP functions are often time critical, a DSP wait state is often impractical or inappropriate at many moments in time. Thus, in one embodiment of the invention, the DSP does not enter a wait state until a "pause" occurs in DSP functioning. Such pauses are often inherent in many communication protocols such as V.34, which may experience regular pauses of 60–80 ms. 60–80 ms is usually sufficient time during which the RISC can load a code module into DSP SRAM. In this manner, code downloads will be almost transparent to DSP functioning.

In embodiments of the invention where pauses are shorter or insufficient in length to download an entire code module, such downloads can be performed piecemeal, whenever DSP functioning allows. Further, it should be understood that while code modules have been referred to herein as complete task code, smaller slices of code can be considered a code module and dynamically downloaded at the appropriate time. Hence, in many embodiments it is not necessary to place the DSP in a wait state.

In some embodiments of the invention the DSP controls the download of code modules from DRAM 312 to SRAM 318, rather than the RISC. The DSP determines during its processing the particular code module the DSP will next require. Then, the DSP will obtain the particular code module either by directly accessing DRAM 312 via the ICCU 338 and core bus 303, or from the 2K memory mapped window, e.g., window 534. By utilizing the sliding 2K window, access to and loading of the next code module can happen relatively quickly. Using such an embodiment where the DSP controls code module downloads does not require the DSP to halt operations or enter into a wait state, but can be done "on the fly" at the time the DSP requires code. As with RISC-controlled downloads, the DSP can also obtain code modules in a piecemeal manner and thus no time critical processes need to be interrupted or delayed.

Message Communication

Figure 18:
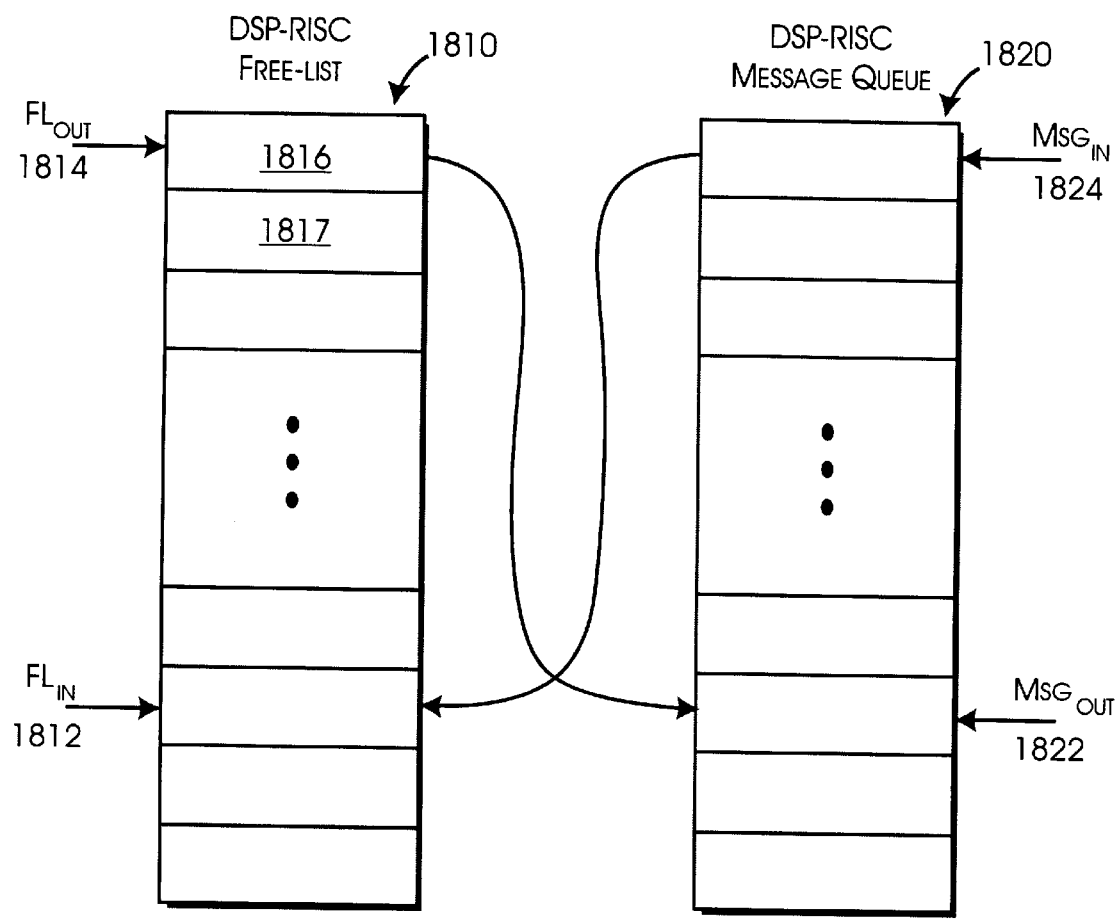
FIG. 18 illustrates circular buffers used in messaging between processors in accordance with one embodiment of the invention.

As alluded to previously, the various processors can communicate with one another using messages. A message is a sequence of bytes placed in a buffer. Message buffers are located, in one embodiment of the invention (FIG. 6), in the RISC memory space (e.g., DRAM 312). For communications from a respective DSP 322 to the RISC 302 two circular buffers are utilized in the RISC memory space: a "free-list" and a "message queue," sometimes referred to herein as a "transfer array." Likewise, for communications from the RISC to a respective DSP, two more similar circular buffers are utilized. Examples of such circular buffers are shown in FIG. 18. Generally, circular buffers are known in the art and comprise a linked list of a predefined number of buffers having an "in pointer" and an "out pointer." As information is placed in the linked list, the "in pointer" is incremented. As buffers are read, the "out pointer" is incremented. When either pointer reaches the "end" of the linked list, the pointer is returned to the beginning of the list, giving rise to the name "circular" buffer.

As shown in FIG. 18, using communications from a DSP to the RISC as an example, a DSP-RISC free-list circular buffer 1810 has an in pointer, $FL_{in}$ 1812, controlled by the RISC, and an out pointer, $FL_{out}$ 1814, controlled by the DSP. In addition, the message queue (transfer array) 1820 has an in pointer, $MSG_{in}$ 1822, controlled by the DSP, and an out pointer, $MSG_{out}$ 1824, controlled by the RISC. To transfer a message from a DSP to the RISC, the DSP will place the message in the message buffer 1816 pointed to by the DSP-to-RISC free list out pointer 1814 and then increment the free list out pointer 1814 so that outpointer 814 points to the next buffer 1817 in the Free-list. The DSP will also write the offset to the message (e.g., the message buffer 1816 address) into the DSP-to-RISC transfer array 1820 at the entry set by $MSG_{in}$ 1822. The DSP will then increment $MSG_{in}$ to point to the next buffer in the transfer array 1820. The RISC will check the transfer array 1820 periodically for changes. If a change is found, the RISC will get a message offset from the DSP-to-RISC transfer array using the $MSG_{out}$ and will access the message. When the message has been accessed by the RISC, the buffer 1816 that held the message is again added to the free-list 1810 by the RISC and the $FL_{in}$ pointer is incremented by the RISC. Similar steps are performed when the RISC sends a message to the DSP where similar (albeit distinct) circular buffers are utilized. Of course, for the DSP to access the message the DSP will need to access the core bus.

Use of circular buffers in this manner, where no two processors control the same pointer, allows messaging to take place in a manner that avoids contention among the processors. Of course, messaging takes place at the direction of code stored in one or more of the respective memories.

The processors can also communicate data between one another using data streams. Data streams are used to transfer continuous data, e.g., audio data or synchronous data, between DSP tasks and RISC tasks, particularly when the tasks are running off of different clocks. There is no size constraint to a data stream, and, in one embodiment of the invention, data streams are transferred using a circular buffer technique using buffers that reside in the RISC memory space. Each data stream has an in pointer and an out pointer. Each variable is updated by only one processor (either the RISC or DSP) depending on the direction of the data flow in the data stream.

Data can also be transferred between DSPs using circular buffers. In one embodiment, buffers are allocated for this purpose in the RISC memory space, but are not managed by the RISC. Data in the buffers is accessed using in and out pointers.

Although messenging has been discussed with reference to FIG. 6, it will apply in a similar manner to FIG. 7.

Remote Diagnostics

Although subsystems 114 and module 120 have been primarily described with respect to communications-type signal processing, subsystem 114 and module 120 are capable of performing a variety of other functions. One such function supports remote diagnostics, where a remote device can diagnose the health (e.g., identify and/or isolate problems) of the user's host system.

To support remote diagnostics, module 120 includes in memory unit 124 a function identifier that identifies the function to be performed as remote diagnostics. In many embodiments, memory unit will further include remote diagnostics program code. When subsystem 114 obtains the function identifier from module 120, the subsystem 114 will, in its boot code, contain code to recognize the identifier as the remote diagnostics identifier and then to obtain program code from the module. In other embodiments of the invention, remote diagnostic program code is stored in a memory unit on subsystem 114 rather than in the module. In either case, when subsystem 114 recognizes the function identifier, it obtains program code from somewhere other rather than the host.

When the remote diagnostics program code is being executed, status messages are collected from the host 110 and stored in a memory unit associated with the subsystem, e.g., DRAM 312, SRAM 318, 318' or other memory unit associated with or internal to the subsystem. A remote device, e.g., a manufacturer's server, can then connect to the module, e.g., via the internet, or other WAN, and can query the stored status information. The remote device can then make a determination about the health of the user's host system 110 even if the host system 110 cannot boot properly.

As should be understood from the above discussion, the scope of functions that can be performed by subsystem 114 and module 120 is extensive. Nevertheless, varying the functions is at a minimized cost to the user.

Thus a signal processing system has been described that can be easily upgraded. For instance, upgrades could easily be made to code by Internet downloads to the host. The upgraded code will be downloaded and run when the subsystem is powered up. Advancements in technology can be easily implemented and obtainable by an end user simply by purchasing a small module at a fraction of the cost of a new system. In fact, with a single subsystem, and a few differing modules, an end user could have a variety of signal processing systems at a fraction of what it would cost to purchase each device individually to form a complete system.

It should be understood that the particular embodiments described above are only illustrative of the principals of the present invention, and various modifications could be made by those skilled in the art without departing from the scope and spirit of the invention. Thus, the scope of the present invention is limited only by the claims that follow.

What is claimed is:

1. A signal processing system, including:
   a plurality of processors; and
   a distributed uniform memory, wherein said distributed uniform memory is subdivided into a plurality of addressable memory spaces respectively associated with each of said processors and wherein each of said processors has access, including reads and writes, to said addressable memory spaces associated with other said processors substantially independent of the load and timing requirements of the other said processors.

2. The system of claim 1, further including:
   a buffer in one of said addressable memory spaces for sending a message from a first processor to, a second processor.

3. The system of claim 2, further including:
   a plurality of buffers, including said buffer, in said one of said addressable memory spaces for communicating messages among said plurality of processors.

4. The system of claim 1 wherein said plurality of processors includes a DSP processor and a RISC processor.

5. The system of claim 1, wherein said plurality of processor includes a plurality of DSP processors and a host processor.

6. A memory sharing system, including:
   a plurality of processors, including first and second processors, each having a respective associated addressable memory space; and
   said associated addressable memory space of said first processor including a mapping of at least an addressably contiguous portion of the memory space of said second processor in said plurality of processors, enabling said processors to share information among said processors substantially independent of the load and timing requirements of said processors.

7. The memory sharing system of claim 6, wherein said plurality of processors includes a DSP processor and a RISC processor.

8. The memory sharing system of claim 6, wherein said plurality of processors includes a plurality of DSP processors and a host processor.

9. The memory sharing system of claim 6, wherein the addressable memory space associated with at least one of said processors includes at least one message buffer for communicating messages between said plurality of processors.

10. In a system having a first processor having a first addressable memory space for storing program and data information and a second processor having a second addressable memory space for storing program and data information, a method of information sharing between said first processor and said second processor comprising the steps of:
    mapping at least an addressably contiguous portion of said second addressable memory space into said first addressable memory space, thereby forming first mapped memory;
    mapping at least a first addressably contiguous portion of said first addressable memory space into said second addressable memory space, thereby forming second mapped memory;
    accessing, by said first processor, said second addressable memory space, by accessing said first mapped memory; and
    accessing, by said second processor, said first addressable memory space by accessing said second mapped memory.

11. The method of claim 10, further including the step of:
    mapping a second addressably contiguous portion of said first addressable memory space into said second addressable memory space, replacing said first addressably contiguous portion.

12. The method of claim 10, further including the steps of:
    directly accessing, by said first processor, said second addressable memory space; and
    directly accessing, by said second processor, said first addressable memory space.

13. The method of claim 10, wherein said step of accessing, by said second processor, said first addressable memory space includes directly accessing said first addressable memory space while said first processor is actively executing.

14. The method of claim 10, further including the steps of:
    updating, in the second addressable memory space, any changes made by said first processor to said addressably contiguous portion of the second addressable memory space while mapped to said first addressable memory space; and
    updating, in the first addressable memory space, any changes made by said second processor to said first addressably contiguous portion of said first addressable memory space while mapped to said second addressable memory space.

15. The method of claim 12, further including the steps of:
    allocating in said first addressable memory space at least one message buffer; and
    communicating messages between said first and said second processors utilizing said at least one message buffer for sending and receiving messages.

16. A computer readable medium for use in a system having a first processor having a first addressable memory space and a second processor having a second addressable memory space, said computer readable medium having a set of instructions stored therein, which when executed by at least one of said processors, causes the first processor and the second processor to share information by performing the steps of:
    mapping at least an addressably contiguous portion of said second addressable memory space into said first addressable memory space, thereby forming first mapped memory;
    mapping at least a first addressably contiguous portion of said first addressable memory space into said second addressable memory space, thereby forming second mapped memory;

accessing, by said first processor, said second addressable memory space, by accessing said first mapped memory; and accessing, by said second processor, said first addressable memory space by accessing said second mapped memory.

17. The computer readable medium of claim 16, further comprising instructions for performing the steps of:

mapping a second addressably contiguous portion of said first addressable memory space into said second addressable memory space, replacing said first addressably contiguous portion.

18. The computer readable medium of claim 16, further comprising instructions for performing the steps of:

directly accessing, by said first processor, said second addressable memory space; and directly accessing, by said second processor, said first addressable memory space.

19. The computer readable medium of claim 18, wherein said instructions for performing said step of directly accessing, by said second processor, said first addressable memory space includes instructions for directly accessing said first addressable memory space while said first processor is actively executing.

20. The computer readable medium of claim 16, further comprising instructions for performing the steps of:

updating, in the second addressable memory space, any changes made by said first processor to said addressably contiguous portion of the second addressable memory space while mapped to said first addressable memory space; and updating, in the first addressable memory space, any changes made by said second processor to said first addressably contiguous portion of said first addressable memory space while mapped to said second addressable memory space.

21. The computer readable medium of claim 18, further comprising instructions for performing the steps of:

allocating in said first addressable memory space a message buffer; and communicating messages between said first and said second processor utilizing said message buffer for sending and receiving messages.

* * * * *